March 21, 1961

G. W. LAPP 2,975,499

CERAMIC TUNNEL KILN

Filed March 14, 1955

INVENTOR.
GROVER W. LAPP

BY

ATTORNEY

March 21, 1961 G. W. LAPP 2,975,499
CERAMIC TUNNEL KILN
Filed March 14, 1955 14 Sheets-Sheet 2

INVENTOR.
GROVER W. LAPP
BY
ATTORNEY

March 21, 1961 G. W. LAPP 2,975,499
CERAMIC TUNNEL KILN
Filed March 14, 1955 14 Sheets-Sheet 4
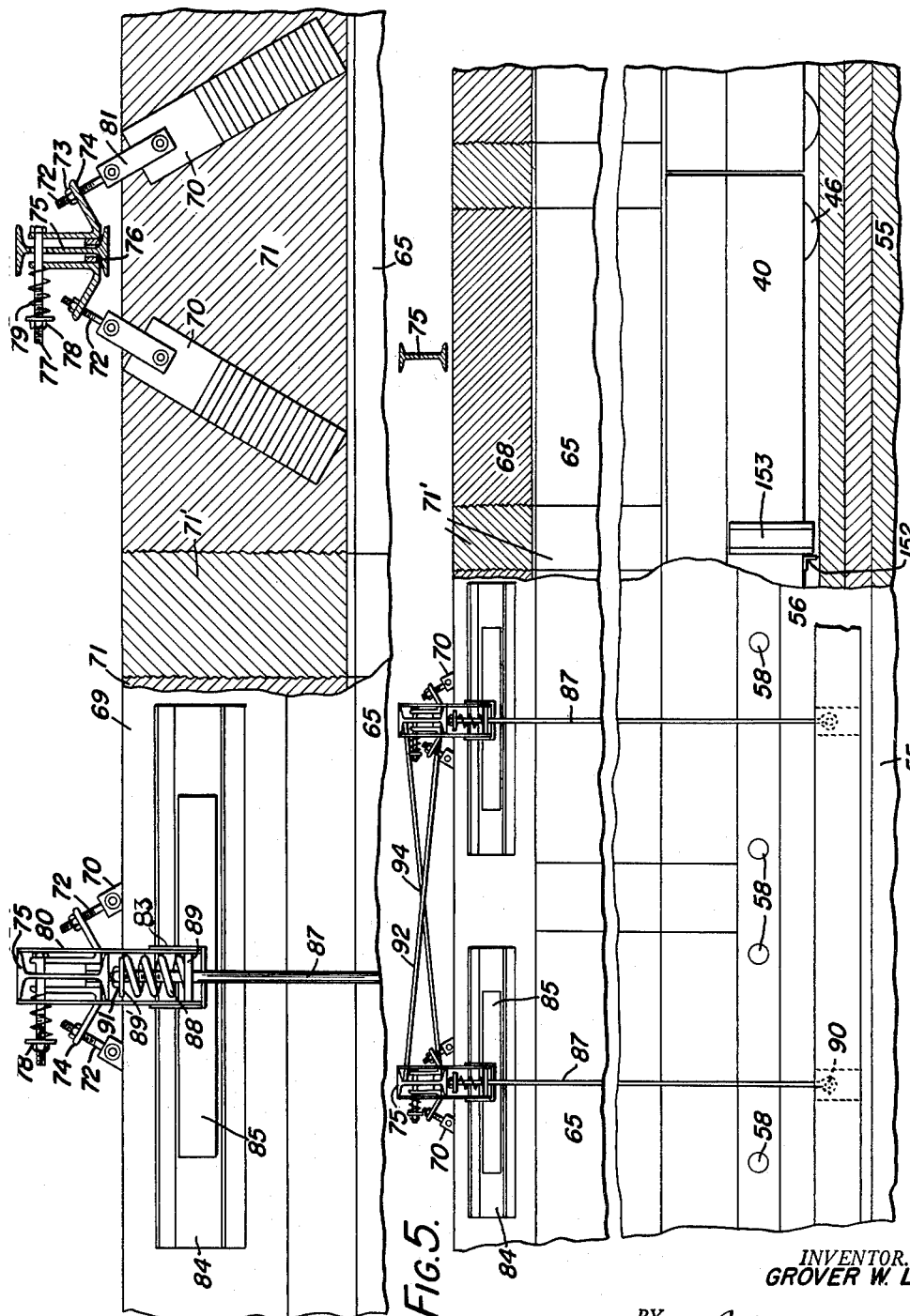
INVENTOR.
GROVER W. LAPP
BY
ATTORNEY March 21, 1961 G. W. LAPP 2,975,499
CERAMIC TUNNEL KILN
Filed March 14, 1955 14 Sheets-Sheet 5

INVENTOR.
GROVER W. LAPP
BY
ATTORNEY

March 21, 1961 G. W. LAPP 2,975,499
CERAMIC TUNNEL KILN
Filed March 14, 1955 14 Sheets-Sheet 6

INVENTOR.
GROVER W. LAPP
BY
ATTORNEY

March 21, 1961

G. W. LAPP 2,975,499

CERAMIC TUNNEL KILN

Filed March 14, 1955

INVENTOR.
GROVER W. LAPP
BY
ATTORNEY

March 21, 1961
G. W. LAPP
2,975,499
CERAMIC TUNNEL KILN
Filed March 14, 1955
14 Sheets-Sheet 8
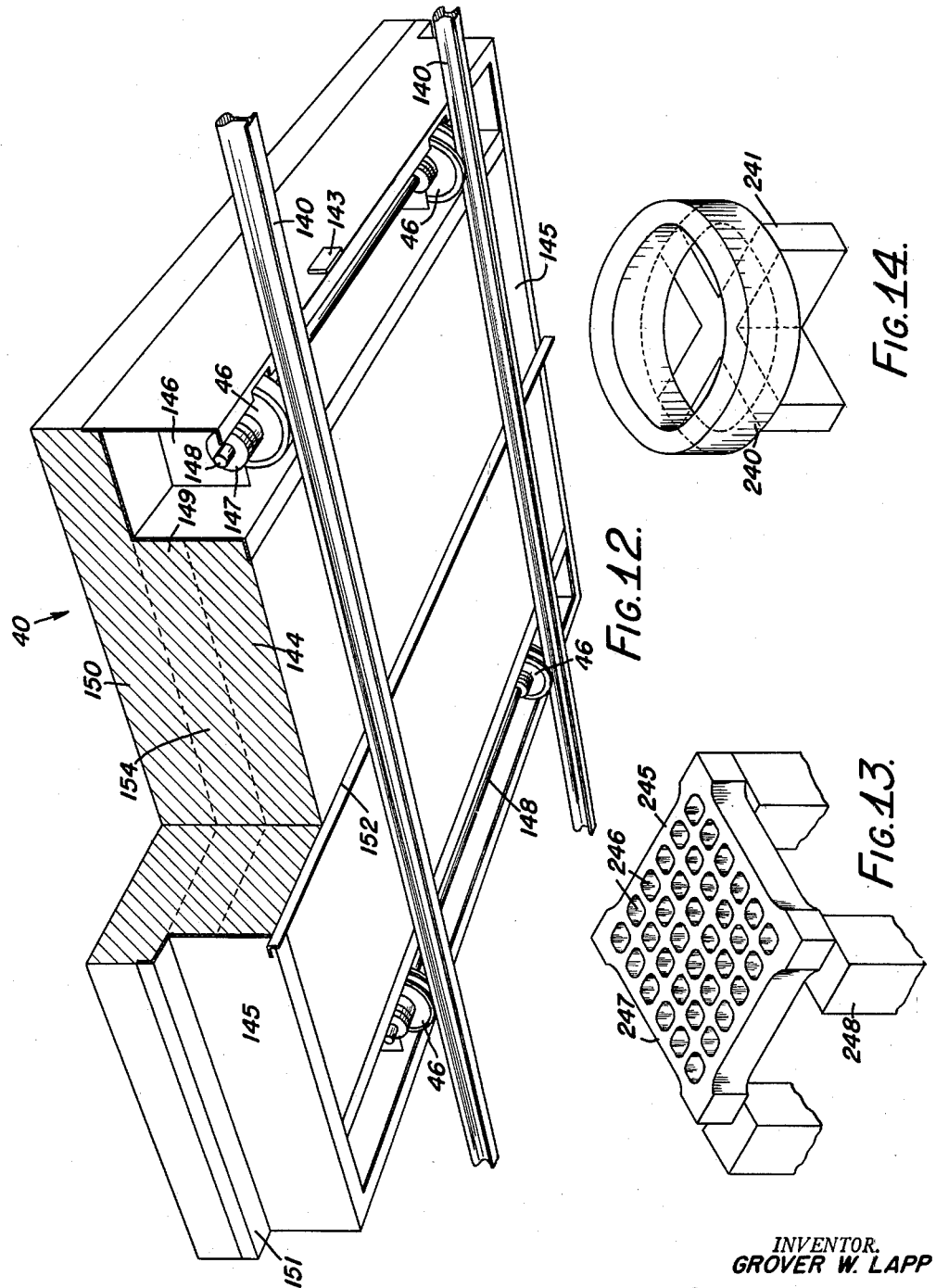
INVENTOR.
GROVER W. LAPP
BY
ATTORNEY March 21, 1961 G. W. LAPP 2,975,499
CERAMIC TUNNEL KILN
Filed March 14, 1955 14 Sheets-Sheet 9

INVENTOR.
GROVER W. LAPP
BY
ATTORNEY

March 21, 1961 G. W. LAPP 2,975,499
CERAMIC TUNNEL KILN
Filed March 14, 1955 14 Sheets-Sheet 10

INVENTOR.
GROVER W. LAPP
BY
ATTORNEY

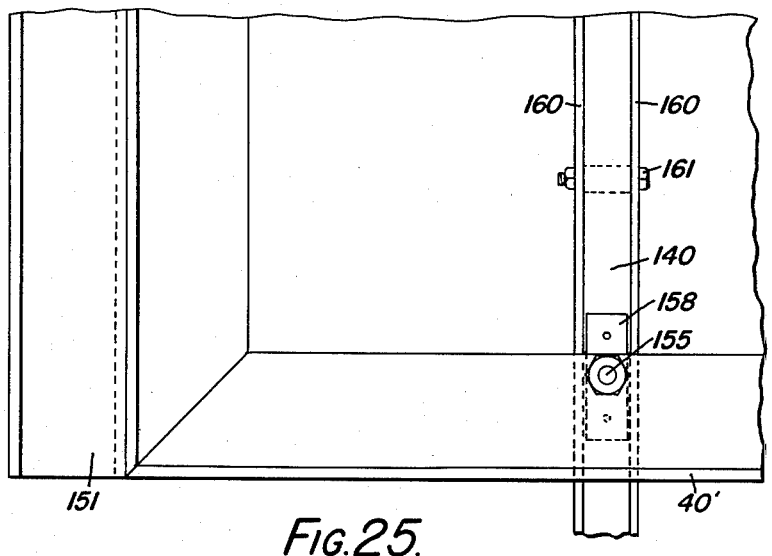
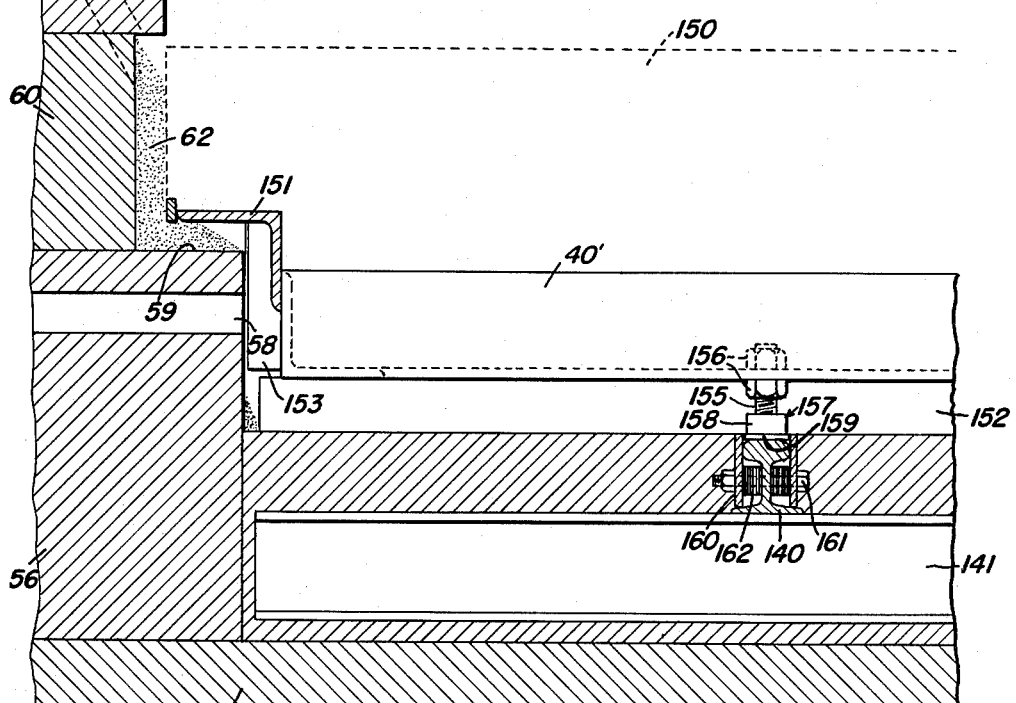

INVENTOR.
GROVER W. LAPP
BY
ATTORNEY

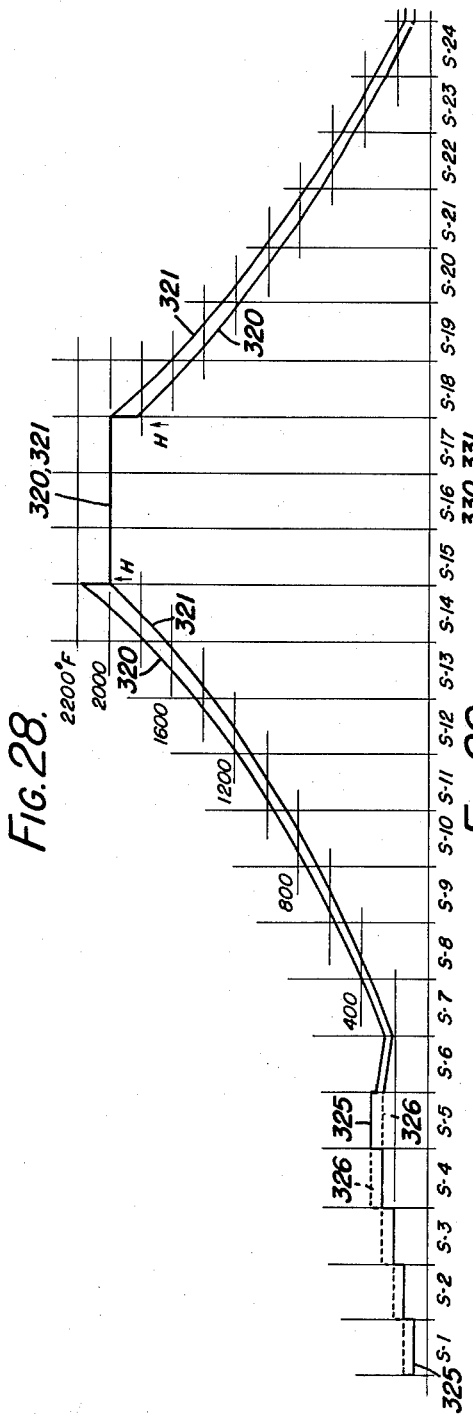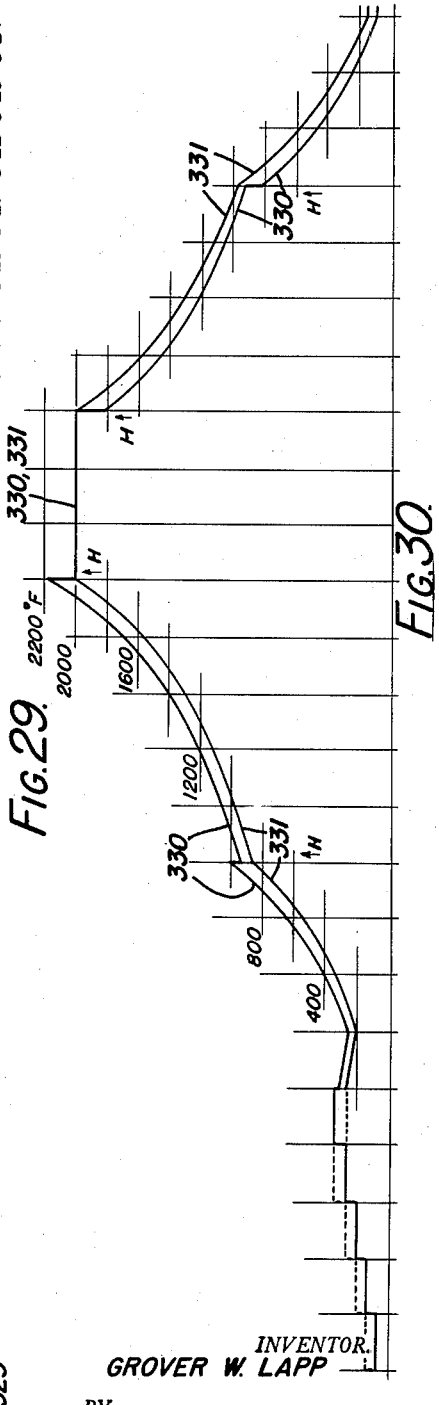

March 21, 1961   G. W. LAPP   2,975,499
CERAMIC TUNNEL KILN
Filed March 14, 1955   14 Sheets-Sheet 14
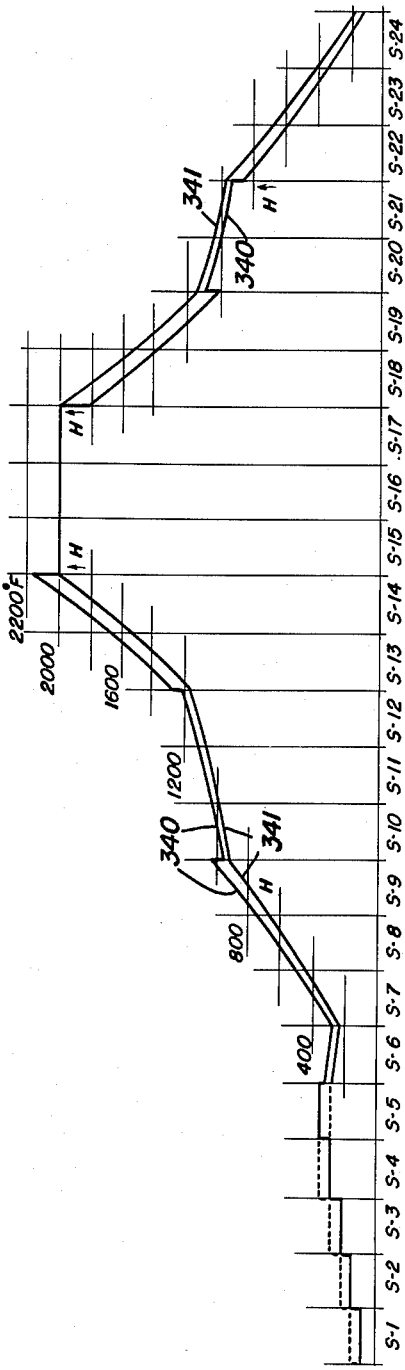
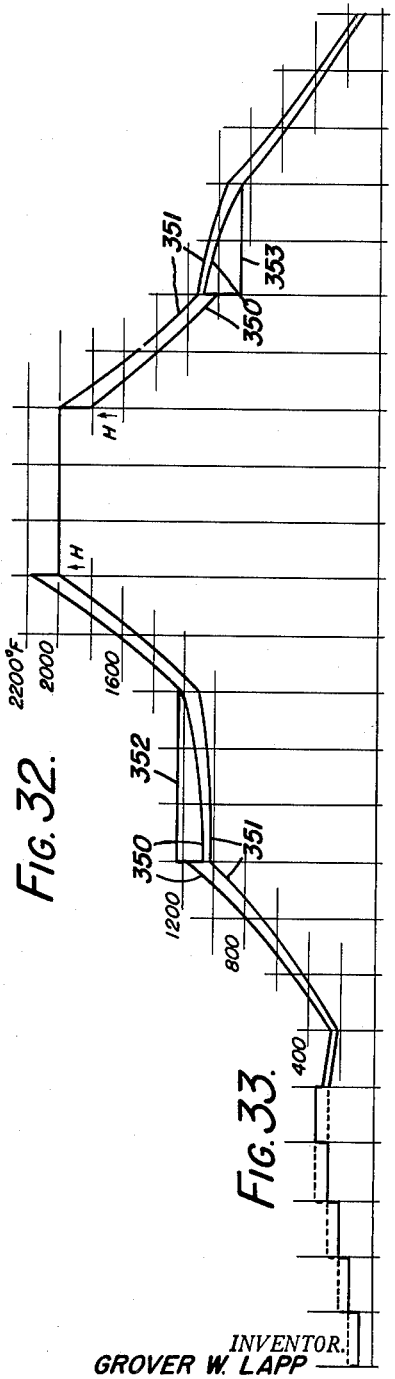
INVENTOR.
GROVER W. LAPP
BY
ATTORNEY

United States Patent Office 2,975,499
Patented Mar. 21, 1961

2,975,499

CERAMIC TUNNEL KILN

Grover W. Lapp, 68 W. Main St., Le Roy, N.Y.

Filed Mar. 14, 1955, Ser. No. 493,905

17 Claims. (Cl. 25—142)

This invention relates to furnaces and more particularly to a tunnel kiln and to the method of operating the same for the firing of bricks or other ceramic products. It may be applied, however, to other types of furnaces, also, such as a heat treating furnace for use in the metallurgical field.

A conventional tunnel kiln consists of a long refractory tunnel through which a train of cars carries the product to be fired. Heat is applied near the mid-point in the length of the kiln by furnaces at the sides of the firing zone; and supplementary burners with hollow walls and mixing chambers and distributing ports and dampers are provided along the preheat zone. The cars are entered one by one at scheduled intervals at the entrance end of the kiln; and they are advanced according to a selected schedule. Their loads of product become hotter as they move toward the fire zone. After the product has been held at top soaking temperature for the desired period, the cars enter the cooling zone, where the product is gradually cooled down toward room temperature as it approaches the discharge end of the kiln.

The refractory load supporting surfaces, or tops of the cars, in effect from the bottom of the heat treating portion of the tunnel. Above the car tops the temperature must be raised high enough to heat-treat the ware or product without heating the lower portions or car body too hot for the metal parts thereof including the bearings. Sand seals between the respective parts of the cars and the adjacent parts of the kiln are ordinarily used in an attempt to prevent the hot gases from getting down below the car tops and thereby overheating the under metal parts and bearings of the cars. This method of sealing is, however, defective in practice. In conventional designs, car bodies of cast iron are sometimes preferred because the temperature beneath the car, under some circumstances, has been high enough to warp and scale steel plate cars and even warp cast iron cars. With conventional constructions, concessions in design and limitations in capacity of the kiln have to be made to prevent overheated cars because of the design of the kiln cars and because of problems with the associated sand seal.

Another difficulty in conventional tunnel kiln design and operation has been the lack of uniform application of heat to the product as the product moves through the preheat and the fire zones. Impingement of flames and radiant heat on the outside, and lack of heat at the middle and bottom of the product setting, or load, result in overfiring the outside and underfiring the center. No matter how slowly the product moves through the fire zone, this effect is present. At higher rates of firing this transverse difference of temperature through the product often limits the capacity of the kiln.

So-called stratification of heat in the preheat end of the kiln has also through the years been a major factor in producing non-uniformity in fired ware. It also is a factor in limiting the capacity of the kiln. Hotter gases tend to stay at the top and colder air at the bottom of the kiln producing in some installations several hundred degrees temperature difference from top to bottom. In addition to this gravitational segregation, the top to bottom difference in temperature is increased by the fact that there is usually more clearance space between the top of the setting of the product and the sprung arch crown of the tunnel, than in the lower portion of the tunnel. The space at the top is made larger because it is difficult to limit clearance of the product under a sprung arch crown. The hotter gases, moreover, tend to be drawn faster through this more open and less-heat-absorbing space.

Designers have tried to minimize this excess of heat at the top and the cumulative chilling at the hard-to-heat bottoms by draining off the cooler bottom gases through a row of stack dampers along the bottom of the tunnel at each side, and by drawing bottom gases out through many fans, blowing these geses back along the top through horizontal slits to oppose the flow of overheated top gases, a procedure known as "Recirculation." This causes local effects where gases are withdrawn and produces spotty fluctuations in the desired smooth temperature gradient. These local effects sometimes produce sudden changes in temperature and cause cracking of some sensitive products. This makes it necessary not infrequently to cut down the flow through the elaborate recirculation system, or even to shut it off entirely. Furthermore, recirculation is limited to the lower temperature gases which a fan can handle; it adds complication and cost to the installation, as well as maintenance, and leaks heat and gas fumes. It must be carefully adjusted to each varying load.

Aside from the disadvantages resulting from so-called stratification of heat, prior kiln constructions are inherently inefficient because of the leakage of cold air from underneath the cars upward through poor sand seals and through the joints between cars.

Looking at the problem in another aspect: in prior arrangements, only a fraction of the flow of air required to cool the hot ware and cars is taken into the kiln since there is danger of cracking the product in the cooling zone as the product passes through the critical temperature. It has been the usual practice to remove a large part of the heat in the ware by lateral radiation and conduction through thin walls, or heat exchange surfaces, to cooling ducts and flues in the walls which carry the heated gases to a waste flue. Thus the heat is degraded in temperature and largely wasted or used for low grade purposes such as for heating buildings and driers. In the cooling zone the tunnel walls have heretofore had, therefore, to be purposely designed to dissipate heat instead of being highly insulated to conserve heat. In addition, much of the heat picked up by a limited amount of cooling air flow has heretofore been wasted since, under conventional practice, it has been allowed to escape through vents before it reached the fire zone.

The former practice in direct-fire ceramic tunnel kilns has been to maintain approximately atmospheric or room pressure in the fire zone, slight negative pressure or suction at the stack or the preheat end, and slight plus blower pressure in the cooling end. Many kilns are set up on piers and the walls in the fire zone are laid on structural steel beams exposing the car wheels to view from the outside. This practice establishes room pressure under the cars through the fire zone, and because of ineffective sand seals almost necessitates continuous large open furnaces to produce minimum difference of pressure end-to-end of the fire zone. Provision of large furnace channels provides for the easy passage of combustion and kiln gases, and prevents these gases from going through the ware and delivering their heat directly to the product. Under these conditions of limited convection heating, radiant heating becomes the major type of heat transfer. Heat transfer by radiation, conduction and re-radiation from side furnaces to the middle of the load requires a series of several of these heat transfer stages, each requiring a difference of temperature, adding up to a large total difference of temperature from the side combustion chambers to the centers of the trainload.

Thus prior tunnel kilns have wasted heat by poor insulation of the walls and by escape of heated gases through these walls. Furthermore in prior tunnel kilns heat recovery from the cooling cars and ware is low; stack losses are high and excessive amounts of heat are wasted in hot car losses, thereby requiring a long firing cycle. A long firing cycle requires substantially more fuel and more kiln length.

One object of the present invention is to provide a continuous tunnel kiln having much better distribution of temperature, top to bottom and side to side, and at each cross-section of the kiln than with previous designs of tunnel kilns.

Another object of the invention is to provide a continuous tunnel kiln in which there will be far more active contact between the gases and the product during both heating and cooling of the same than can be achieved in prior designs of tunnel kilns.

Another object of the invention is to provide a method of heat treating products, and a continuous tunnel kiln, in which the same may be practiced, which will permit of achieving substantial uniformity of temperature throughout a ware setting as the ware passes through the critical temperature both in the preheating and in the cooling zones.

Another object of the invention is to provide a method of heat treating products, and a continuous tunnel kiln, with which the method may be practiced, which will permit of maintaining substantially uniform temperature throughout each setting at each stage of advance of the setting through the tunnel.

Another object of the invention is to provide a method of heat treating products, and a continuous tunnel kiln, in which the method may be practiced, with which it is possible to approach very closely to the ideal of an isothermal front at all cross sections of the tunnel.

Another object of the invention is to provide a method of heat treating products, and a continuous tunnel kiln for practiceing the same, which will permit of readily controlling the temperature gradients at selected locations in the preheat and cooling zones.

Another object of the invention is to provide a method of heat treating products, and a continuous tunnel kiln, in which the method may be practiced, with which the rate of temperature rise in the preheat zone and of temperature fall in the cooling zone can be slowed down in the critical range for free silica to avoid cracking of the product.

Another object of the invention is to provide a continuous tunnel kiln of improved structure which can be made largely from precast units assembled on the job.

Another object of the invention is to provide a substantial monolithic kiln structure having high refractory quality at the inside and gradually increased insulating quality toward the outside.

Another object of the invention is to provide a continuous tunnel kiln of improved structure which will confine the gases closely about the work, and which while less expensive than conventional kilns will nevertheless operate more efficiently.

Another object of the invention is to provide a continuous tunnel kiln which may be built with walls straight through from end to end of the kiln and with a crown having minimum clearance relative to the moving settings.

Another object of the invention is to provide a method of heat treating products, and a continuous tunnel kiln, in which the method may be practiced, with which no kiln length is wasted, and the firing time can be reduced to nearly the minimum possible time.

Another object of the invention is to provide a method of heat-treating products, and a continuous tunnel kiln, in which the method may be practiced, which will permit of projecting burner gases or fuel safely at any temperature into the tunnel without danger of local impingement on or of local overheating of the product.

Another object of the invention is to provide a method of heat-treating products, and a continuous tunnel kiln, in which the method may be practiced, which will permit of using the least expensive fuel.

Another object of the invention is to provide a method of heat treating products, and a continuous tunnel kiln, in which the method may be practiced, which will permit significant reduction in the number of cars employed, and an increase in the rate of gas flow through the tunnel as compared with conventional kilns.

Another object of the invention is to provide a method of heat treating products, and a continuous tunnel kiln, in which the method may be practiced, with which the kiln capacity can be materially increased, as compared with conventional kilns, with no increase in total draft requirement.

Another object of the invention is to provide a method of heat treating products, and a continuous tunnel kiln, in which the method may be practiced, with which the length of the cooling zone can be diminished.

Another object of the invention is to provide a method of heat treating products, and a continuous tunnel kiln, in which the method may be practiced, with which a setting may be readily "flashed" or colored as it travels through the kiln.

Another object of the invention is to provide a continuous tunnel kiln and a method of operating the same which will require a minimum of attention from the operator.

Another object of the invention is to provide an improved car construction for continuous tunnel kilns which provides much better insulated, and lighter cars than previous constructions, and at a cost much less per square foot.

A further object of the invention is to provide a continuous tunnel kiln having an improved sand seal which will insure keeping of the lower structure of the cars, including the bearings, cool, and and which will therefore materially prolong car life.

Another object of the invention is to provide an improved type drier for drying ceramic ware prior to baking.

Another object of this invention is to provide a new type of convection tunnel kiln with which a product drier may be continuously connected.

A further object of the invention is to provide a new type of convection tunnel kiln with which a product drier may be continuously connected and which will permit operation of both the drier and the kiln from a single fan.

Another object of the invention is to provide a method of baking brick, and a tunnel kiln for practicing this method, which will permit increased productive capacity without increase in the size of the kiln.

Another object of the invention is to provide a method for heat treating products, and a continuous tunnel kiln, in which the method may be practiced, which permits of using burners that are simple fuel injectors without the usual complication of proportional air supply.

Another object of the invention is to provide a method of heat treating products, and a continuous tunnel kiln, in which the method may be practiced, which permits of using approximately the same type of jet for atomizing liquid fuel, and injecting and scattering gaseous or liquid fuel, and for mixing the gases in each section of the kiln to obtain substantially uniform temperature throughout the section.

Still another object of the invention is to provide a method of heat treating products, and a continuous tunnel kiln, in which the method may be practiced, which can be operated at a low or even zero rate, but with which full rate operation may be resumed promptly.

A still further object of the invention is to provide a method of heat treating products, and a continuous tunnel kiln, in which the method may be practiced, which permits of using one system or source of pressure air for the entire kiln in all temperature zones.

Other objects of the invention will be apparent hereinafter from the specification and from the recital of the appended claims.

In the drawings:

Figs. 1, 2 and 3 are fragmentary, more or less diagrammatic, views, with parts broken away, taken, respectively, at different points along the length of a combination dryer and kiln built according to one embodiment of this invention, Fig. 1 illustrating more or less diagrammatically the drier and the adjacent portions of the kiln, and showing a car ready to enter the kiln, Fig. 2 illustrating more or less diagrammatically a further portion of the kiln, and Fig. 3 illustrating more or less diagrammatically a still further portion of the kiln including the cooling section thereof, and showing a car discarged from the kiln;

Fig. 5 is a fragmentary part side view, part longitudinal section showing details of the crown supports of the kiln;

Fig. 6 is a part side elevation, part longitudinal section on a reduced scale further illustrating the crown supports, the section being taken in a plane parallel to the plane of the section of Fig. 5, and showing also some of the kiln cars;

Fig. 11 is a more or less diagrammatic perspective view illustrating how bricks may be stacked for horizontal flow of the kiln gases;

Fig. 12 is a perspective view, looking at the bottom of a wheeled kiln car from beneath the rails on which the car travels;

Fig. 13 is a perspective view of a section of a perforated superdeck such as may be employed on the cars in the treatment of pipe or other products which are to be treated by vertical flow of the kiln gases;

Fig. 14 is a perspective view of the ring and spider used in conjunction with the superdeck for supporting pipe from a car;

Figure 21:
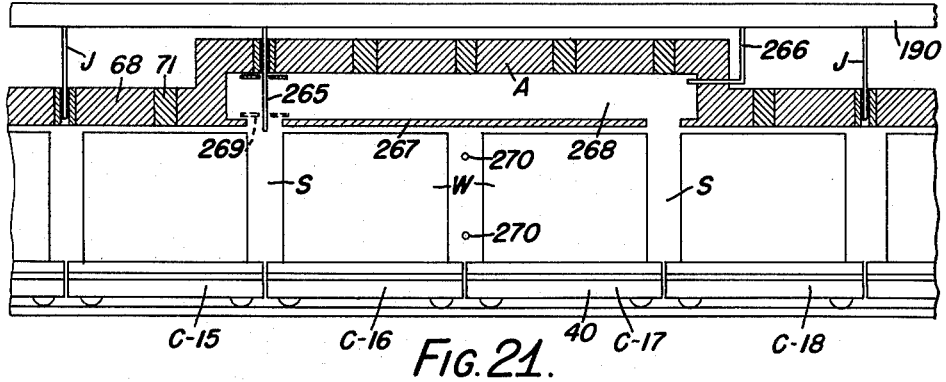
Figure 22:
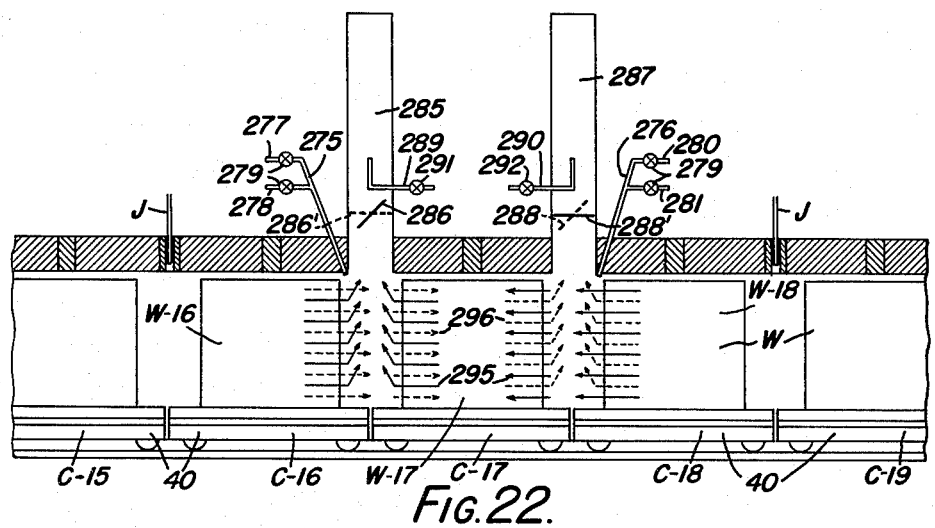
Figure 23:
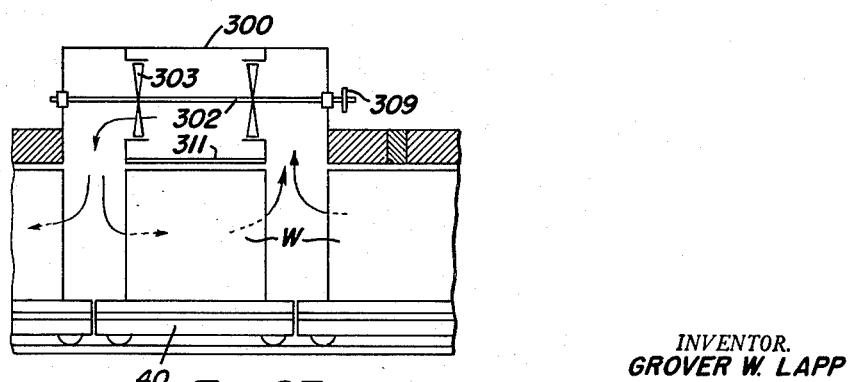
Figure 26:
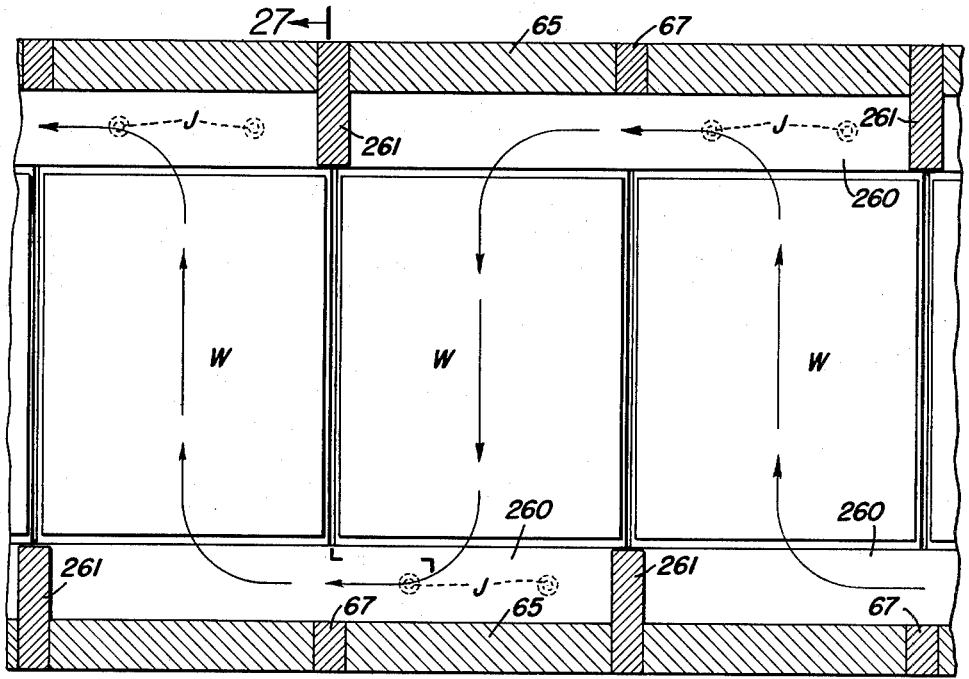
Figure 27:
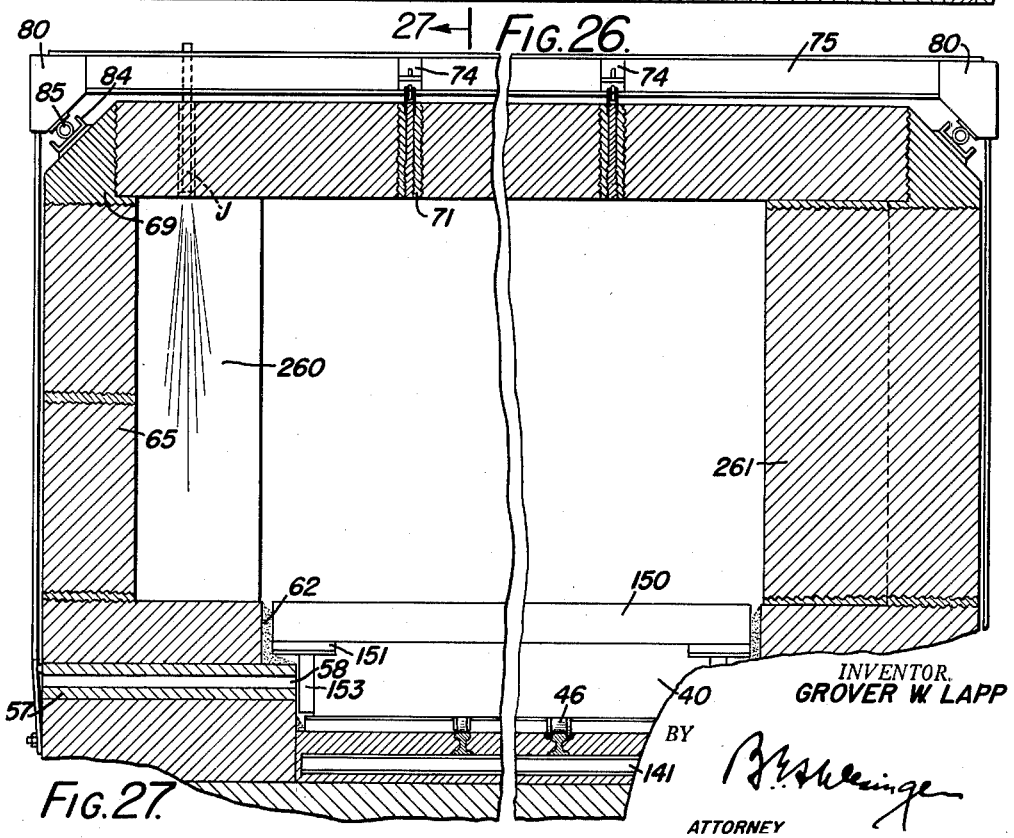

Fig. 21 is a fragmentary, more or less diagrammatic, longitudinal section on a reduced scale showing how a bypass may be used to shunt the flow of kiln gases around one or more cars in the fire zone and to stop the flow of tunnel gases through the setting of the product for the purpose of injecting fuel or other material to cause a strongly reducing, fume-laden atmosphere for "flashing" or coloring of the product;

Fig. 22 is a more or less diagrammatic longitudinal section illustrating a method of "flashing" or coloring the product;

Fig. 23 is a fragmentary section illustrating diagrammatically one way of bypassing air around a car and recirculating it to bring the temperature down uniformly in a stack of product on a car when passing through the critical temperature zone;

Fig. 24 is a fragmentary transverse section on an enlarged scale showing a portion of the kiln wall and a portion of a modified form of kiln car which is supported by skid shoes instead of wheels;

Fig. 25 is a fragmentary plan view of the parts shown in Fig. 24, the refractory being removed;

Fig. 26 is a fragmentary horizontal section through a kiln constructed according to another embodiment of my invention for horizontal serpentine flow of the kiln gases;

Fig. 27 is a fragmentary section taken on the line 27—27 of Fig. 26 looking in the direction of the arrows;

Fig. 28 is a diagrammatic view showing a twenty-four car kiln;

Fig. 29 is a diagram showing how this kiln may be operated with simple temperature gradients with heat applied in the fire zone only;

Fig. 30 is a diagram showing the preheat and cooling gradients modified by addition of heat at one point in each gradient;

Fig. 31 is a diagram of a twenty-four car kiln illustrating another method of operation;

Fig. 32 is a diagram showing how temperature gradients may be flattened out through the critical 1067° F. range by the addition of cold room air at the upper end of this middle range and the addition of heat at the lower middle range; and Fig. 33 is a diagram corresponding to Fig. 31 and showing temperature gradients modified by the use of bypasses.

The tunnel kiln of the present invention has thoroughly insulated walls and top, providing an essentially monolithic structure without open joints and cracks through which air at room temperature can infiltrate. Air is drawn by the stack fan through the exit end of the tunnel and travels all the way through the tunnel to the stack fan. As it travels over the hot ware in the cooling zone and in the firing zone it picks up heat; and as it travels over the ware in the preheat zone it delivers up this heat, heating up the ware toward the firing temperature. It flows counter to the flow of the ware. With this system, maximum heat absorption and minimum stack losses result. Likewise, enough cooling air is drawn into the exit end of the kiln to recoup the heat most fully by convection and to transport the heated air into the firing zone without the problems and conditions that usually prevent such a heat-saving operation. To distribute the heat uniformly throughout the cross sections, large free transverse spaces are left between the settings of products. This is achieved, in the case of product stacked for horizontal flow of the tunnel gases, such as brick, preferably, by leaving spaces vacant at the ends of each car preferably in excess of twenty percent of the car length. It is achieved in the case of product stacked for vertical flow of the tunnel gases, such as pipe, preferably by leaving spaces above and below the settings. It may also be attained by stacking the settings of product so that they cover substantially the full areas of the cars and by providing plenum spaces in the kiln at opposite sides of the cars, and directing flow of the tunnel gases in a horizontal, serpentine path. The large, free plenum spaces provide places for the addition of fuel and heat from the burners, and for the introduction of various supplementary hotter or cooler gases for the modification and control of the temperature gradients at desired locations in the preheat and in the cooling zones, and for removal of car cooling air. These plenum spaces make possible the complete withdrawal of pre-heat stack gases from the entire face of the setting at one location. There are no separate combustion chambers required at the sides of the tunnel at the firing zone. Instead, heat is liberated in the ample plenum spaces from heat sources either located in the crown of the kiln and blasting downwardly, or located in the lower bench wall of the kiln and blasting upwardly, or suitably located in the side walls of the kiln and blasting transversely inwardly into the plenum spaces.

The plenum-spaces serve as combustion chambers in the firing zone, taking the place of the usual overheated furnaces at the sides of the firing zone. In the preheat zone they take the place of a series of supplementary burners with their hollow walls, mixing chambers, and distributing ports and dampers.

To atomize fuel, and to diffuse or scatter hot gases, or cooling air, in the plenum spaces, jets are provided. The jets inject, entrain, mix with, and scatter fuel or supplementary gases, to insure active circulation and uniformity of temperature throughout each plenum space of the tunnel. In plenum spaces where there is no addition of hot or cold gases to modify the temperature gradient, the jets are, nevertheless, provided, to remix the variable streams of tunnel gases emerging from the previous setting, so that they enter the succeeding setting with uniform temperature over the whole face of the succeeding setting.

Where the plenum spaces are located between successive cars, or where there is vertical serpentine flow of the tunnel gases, the train of cars is advanced or indexed intermittently a whole car-length, or unit setting length, at each schedule interval. The cars stand still during the intervals between indexing; and the plenum spaces between, or above and below, the settings then register with the heat sources, or with the mixing jets, or with the stack connection, or with fixed openings for recirculation in the drier section, depending on the particular position of the cars in the tunnel. Where the plenum spaces are at the sides of the kiln, and the tunnel gases have horizontal serpentine flow, the cars may be indexed intermittently or may have continuous movement. In the case of the horizontal serpentine flow of the gases, the settings on the cars are brought into registry with the plenum spaces; and the different plenum spaces are always in registry with the heat sources, the mixing jets, stack connection etc. depending on the location of the different plenum spaces along the kiln. In all cases, the combustion gases are drawn by the stack fan all the way through the settings on the cars and are kept actively stirred, car by car, by the air jets to maintain uniform heat distribution. In the cooling zone also, jets are used to produce uniform temperature distribution as the cooling air is drawn through by the stack fan.

The combined drier and kiln of the present invention may be made of any desired length to accommodate any desired number of cars. In the embodiment of the invention illustrated in the drawings, however, the tunnel is shown as accommodating twenty-four cars. The cars are denoted at 40.

Figure 1:
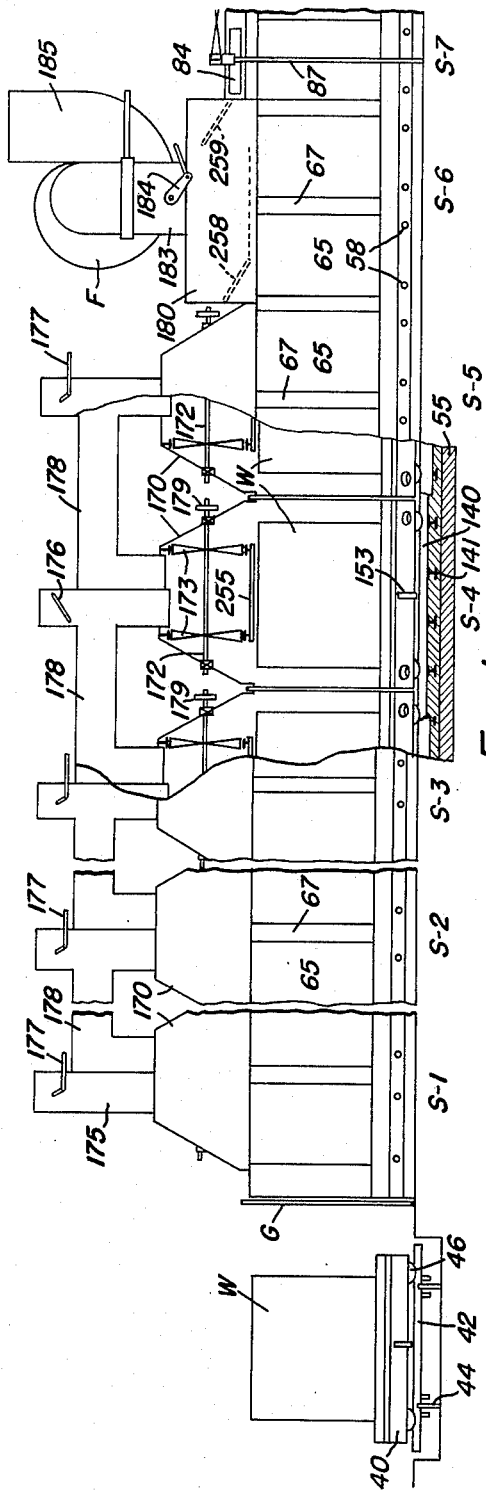

In the case of a product, such as brick, where horizontal, straight-line flow of the tunnel gases through the settings is desired, each car is loaded with the product W, which is to be baked, so that there is space left at both ends of each car, as seen at the left in Fig. 1. A car, for instance, may be eight feet long; and the product may be so loaded on the car that a space nine inches to one foot will be left empty at each end of the car.

A car 40 is shown at the left in Fig. 1 ready to be pushed into the drier section of the tunnel when the entrance gate G is lifted. This car is mounted by means of its wheels 46 on a transfer car 42 whose wheels are denoted at 44. The transfer car is movable in a direction transverse of the kiln for easy loading of the product upon the car.

Figure 2:
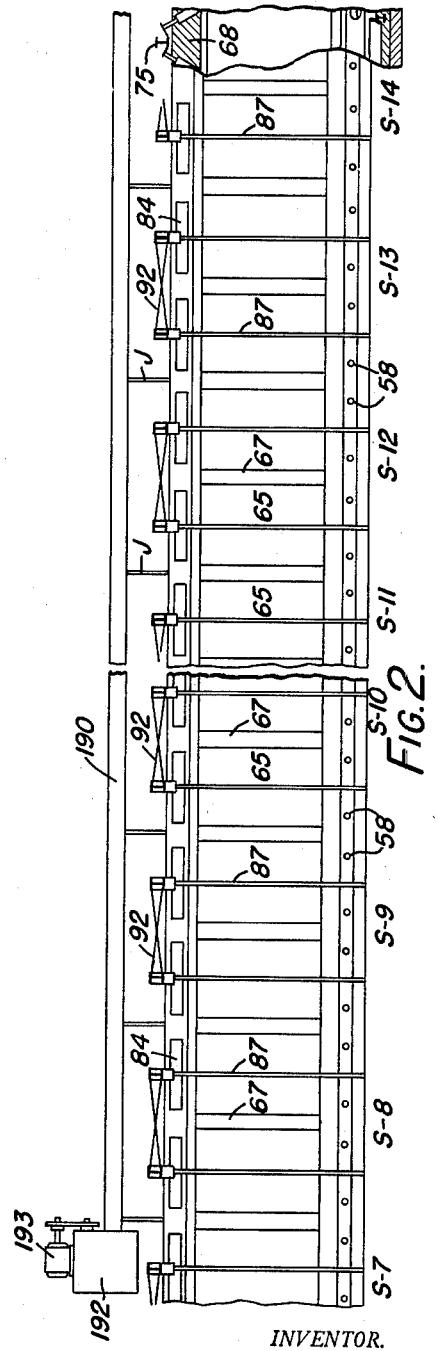
Figure 3:
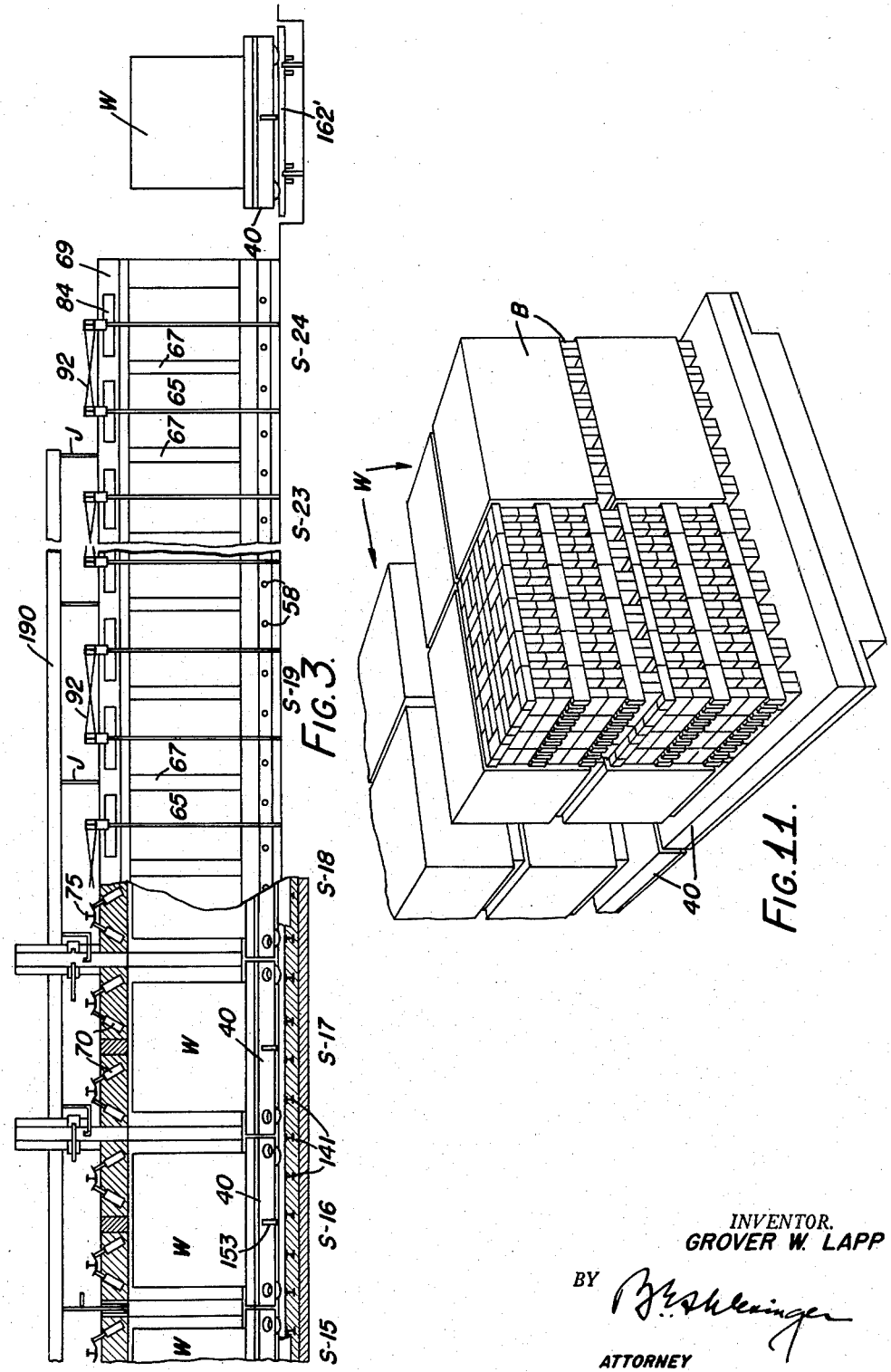

Figs. 1, 2 and 3, when arranged end to end, in the order named, diagrammatically illustrate a combined tunnel type drier-kiln combination in which the drier comprises five sections, S–1 to S–5 inclusive, each a car length in length, and in which the kiln, including the preheat, firing, and cooling zones comprises the remaining nineteen sections S–6 to S–24 inclusive, also each a car length in length.

The cars 40 are periodically pushed or indexed from the entrance end to the exit end of the tunnel, by means not shown, according to a given schedule.

The ends of the tunnel may each be provided with a pair of closures or gates G to be operated after the manner of an airlock, or, as is preferred only the entrance end is provided with a gate or a pair of gates to provide an airlock.

A pipe 190 for air or other gas under pressure, is provided along the kiln proper. This pipe has jets J connected to it which discharge high velocity room air, or high temperature blasts from burner jets, into the tunnel in given locations at some or all stations. A single fan F draws gases under negative pressure from the exit end of the kiln through the tunnel to the stack and also provides an exhaust from the drier to the stack, although a separate fan may be provided for each of these functions.

Figure 4:
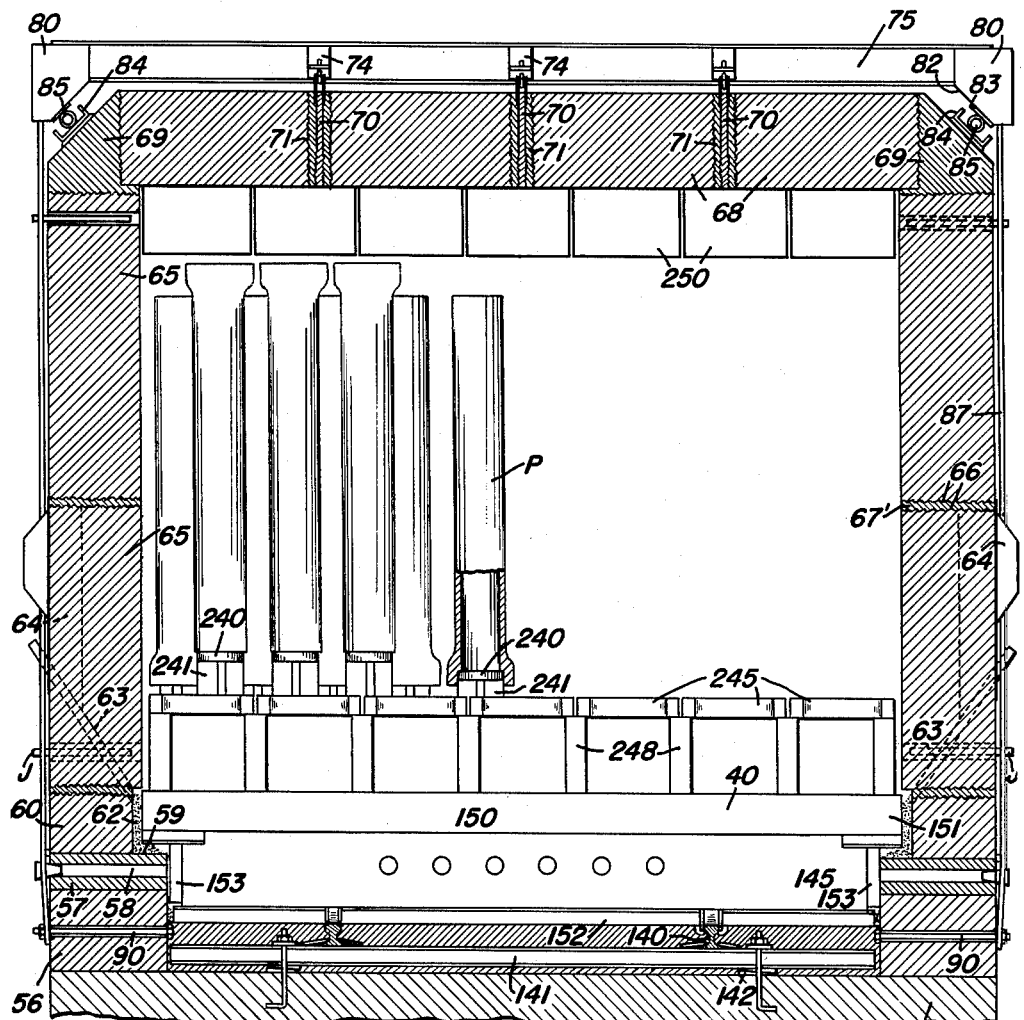
Fig. 4 is a cross section of a kiln constructed according to one embodiment of this invention, showing a car therein loaded with pipe, and illustrating how the pipe may be loaded for vertical flow of the gases through a serpentine path.

The kiln may be constructed in several different ways. As shown in Fig. 4, the kiln has a base or foundation 55 of concrete suitably reenforced by metal rods or mesh (not shown) as required by ground conditions at the site of the kiln. Concrete benches 56 spaced from each other at the desired width of the kiln, are poured on the concrete foundation to extend the full length of the kiln. A course, or bench layer, or cap strip, of semirefractory insulating material 57 is cast on the top of each of the concrete benches 56. Each of these layers has a row of ventilating car-cooling holes or ports 58 formed therethrough to carry room air into the lower part of the kiln for ventilating the metal car bodies and the bearings of the several cars 40 which pass through the kiln. These ports may be plugged or left open, as required. On top of the layers 57 at each side of the kiln are poured bench walls 60. Each of the bench walls 60 is narrower than the associated cap strip 57 to leave a broad ledge 59 to retain the sand of the sand seal as will appear hereinafter.

On these foundation structures, side wall sections 65 are built up in superimposed position on each side of the kiln with grouted joints 67' therebetween. The wall sections 65 constitute a special feature of the kiln structure. Each wall section is a relatively large pre-cast block of the order of thirty-four or sixty-eight inches in height, forty inches in length, and about fifteen inches in thickness, which is corrugated on both ends as denoted at 66. Crown sections 68, similar to the side wall sections 65, and also having corrugated ends, close the top of the kiln. The crown sections rest on and are bedded at opposite sides of the kiln in refractory concrete 69 poured on the upper edges of the side sections 65.

The side wall panels 65 and crown panels 68 are monolithic blocks of high grade castable refractory, which are graded during formation so that they have heavier, more refractory material on their inner, or high temperature sides with gradually increasing proportions of lighter-weight castable toward the outside, such lighter-weight castable having much higher insulating value and costing much less per cubic foot. This type of monolithic graded refractory is most suitable in many respects for continuous end to end block construction in the walls and crown of the kiln because it is so very stable in volume that there is no lineal expansion from mold size at 2000° F. and higher. The various grades and brands of this material enjoy this characteristic so that they are compatible with each other. Castables are now available for use upwards of 3000° F. Refractory blocks constructed in this manner have been shown to be stable and free from internal cracking when heated repeatedly to kiln temperature on one side only. The hot face acquires a ceramic fire bond while the outer temperature face retains its hydraulic cement bond. At some point in between the intermediate bond is somewhat weaker but still ample to prevent cracking. By locating the wall load outside of its midpoint of thickness, the inner hot face can be entirely relieved of any compressive loading. This low-expansion type of refractory block is particularly suitable for use in the crown of the present kiln, because of the unusual width of the crown, so that the flat arch will not push and pull the side walls to a harmful degree.

For regularity of spacing, two transverse rows of precast crown blocks 68 and side wall sections 65 can be conveniently used per car length. For an eight foot car length, for example, the crown blocks 68 and wall sections 65 are forty inches long with eight inches spaces between poured with similar light weight castable material keyed together by eight inch fillers 67 (Fig. 1), 71 (Fig. 4), respectively, of castable material poured and locked in place between the corrugated edges of the blocks 68, 65.

The crown sections 68 are supported by crown hangers 70 anchored in poured refractory butt joints 71 between the corrugated sides of the transversely aligned crown sections. The longitudinally aligned crown sections 68 are connected by poured refractory joints 71.

A pair of crown hangers 70 is suspended by rods 72 and nuts 73 (Fig. 5) from a pair of brackets 74 which, in turn, are suspended from a crown support beam 75. Each bracket is in the form of an angle iron clip with a fulcrum bearing 76 at the junction of its arms that bears against one side of the lower part of the web of the beam 75. One arm of a bracket 74 adjustably supports a crown hanger 70. The other arm of the bracket, in cooperation with the related arm of its cooperating bracket, has a bolt 77 passing therethrough and through the web of beam 75. A nut 78 and spring 79 permit resilient adjustment of each pair of brackets about their fulcrum bearings 76, thereby providing the desired supporting tension for the several crown hangers. The crown hangers are corrugated, the better to hold in the poured refractory joints 71. They are connected with bolts 72 by links 81.

At each end of a crown beam 75 there is welded at opposite sides thereof a side palte 80 with a lower edge 82 (Figs. 4 and 5) which is inclined at an angle to the vertical, for example, forty-five degrees. A bearing strip 83 bridges the edges of the two side plates 80 at opposite sides of a beam, and is welded thereto. Each strip 83 faces a channel shaped bearing 84 mounted in inclined position on the refractory concrete fill 69 on the top of a side wall of the kiln. An elongate roller 85 riding in the bearing 84, engages the related bearing strip 83 to support one end of each crown beam 75. Hold won rods 87 (Figs. 5 and 6), with cooperating springs 88 engage the bearing strips 80, to anchor the crown beam to a bolt 90 set in the foundation. Each spring 88 surrounds a rod 87 and is interposed between a perch 89, that is secured to the side plates 80, and a disc 89', that is adjusted by a nut 91 which threads on the rod.

Pairs of crown beams are held against tipping by diagonal tie rods 92 (Fig. 6) secured at their respective ends to the adjacent sides of pairs of beams 75. Each pair of tie rods is welded together at the point of crossing 94 of the rods. It should be mentioned that while pairs of crown beams are thus tied together, each beam bears only its own load and is free to spring or deflect appropriately; and the several pairs are not tied to each other, since it is desired to have some degree of flexibility in supporting the crown structure. The mentioned supporting structure of the crown can be conveniently referred to as a steel harness.

In the design of the assembled structure shown, consisting of wall and crown units and the steel harness, forces due to the known weight of the elements and the draft load can be calculated for a determinate, rational engineering design. A calibrated spring 88 can be used in the hold-down rod 87 on one or both sides to measure the forces and help produce uniformity of their intensity with the very slight expansion and contraction displacements that will be present. The displacements can be measured as spring deflections. In a similar way the hanger lift forces supporting the crown, can be measured by their calibrated springs 79 to provide permanent indicators of changes that may occur through the years, and afford means of making quantitative adjustments as desired.

It will be observed that the angle of the rollers 85, that is, of the angular strips 83 (Fig. 4) of the side plates 80, determines the ratio of weight plus hold-down force with respect to the horizontal, balanced, compressive forces on the ends of the crown sections. This ever-present buttress pressure on the crown units guarantees that the joints between crown sections will never move or loosen so that the crown support hangers cannot loosen or pull out. At forty-five degree, as shown, the vertical and horizontal components of force at the roller contact are equal. Also in the position shown the horizontal force is applied at about the middle of the crown depth while the downward vertical component is approximately at the outside of the middle third of the thickness of the kiln wall. At this position for a monolithic wall unit, the unit compressive force will be twice the average in the outside of the wall, and the compressive load will be zero at the hot inside face. The angle of contact, and the position of the roller 85 can be chosen by the designer, and can be changed at any time after the kiln is constructed and in use. This is a distinctive and significant principle in the present kiln.

The panel units 65, 68 may be precast at a factory or on the site of the kiln. They can be set in place quickly and precisely to form the walls and crown of the kiln and then the joints 66, 71, 71' (which may be six to eight inches wide) can be poured, using very light weight castable between the corrugated surfaces of the panels to form a keyed-together structure, equivalent to a monolithic job.

It is safe to use such tightly-set wall and crown structures without expansion joints, because of the remarkable physical properties of modern castable refractories. At 2000° F., the dimensions of a cast unit 65, 68 may be slightly less than the mold size at which it is cast. The shrinkage due to ceramic bonding on first firing, offsets the slight thermal expansion of the material. On subsequent cooling and heating, a very slight reversible thermal contraction and expansion are present, insuring the absence of harmful expansion effects, even without expansion joints, in nearly all cases. However, paraffin or asphalt may be sprayed on the joints to allow for expansion and contraction if desired.

Low thermal expansion is also very desirable for the crown, especially for a wide tunnel. For a tunnel twelve feet wide, the very slight range of about 3/16" on a side at 2000° F., is negligible. This means that a kiln can be cooled and heated up again repeatedly with safety and in a short time. An advantage of these prefabricated panel units 65, 68 is the elimination of loose insulating material, and of retaining walls or jackets of metal. The walls and crown are completed in simple operations and can be made gas-tight as well as having a very small constant of thermal conductivity.

The high degree of stability and gas tightness of this large-unit panel construction presents a great improvement over traditional brick kiln construction with its multiplicity of small units and joints subject to cracks and leakage. Freedom from leakage is a major requirement for the use of suction or negative pressure throughout the kiln.

Through the liberal joints 67, 71, 71' of very light castable refractory between units 65, 68, holes can be easily drilled or cast for firing, for inspection openings, or for inserting pyrometer thermocouples and other purposes, without reducing the structural integrity of the wall or crown units.

The crown construction provides a flat top instead of the usual sprung arch. Among the advantages of this flat form is the ease with which clearance from the ware settings can be minimized since most products can be readily set to a rectangular pattern with a flat top. This type of crown also reduces the height of the kiln considerably. Moreover, it provides a level top surface for inspection, maintenance, and the mounting of equipment. Lower height permits a lower building to be used. The novel type of mechanical support shown provides a large factor of safety, and makes it possible to build a tunnel of practically unlimited width and height.

There are many advantages in the use of a flat crown, even for conventional kilns. It is expensive and undesirable to stack the settings up in the center of the cars to minimize excessive leakage of hot gases through the arch space of a conventional curved arch. For kilns of extraordinary widths, which are permissible with my kiln design, the flat arch becomes a very great advantage. The construction shown in cross section in Fig. 4 provides a design having any desired factory of safety for any width of kiln with no increase in the thickness or height of the crown. The crown is built in transverse rows of refractory insulating units held together by heavy end pressures and supported by high strength ceramic, or refractory metal, hanger blades, embedded in the compression joints, and extending all the way through to the lower or inner side of the crown.

The horizontal thrusts from the two ends clamp the blocks tightly together so that the joints become rigid without the articulated movement, which is the weakness of the usual sprung arch. The vertical component of the roller thrust is the half weight of the arch and its beam support plus the downpull to the anchor rod. This assembly of crown blocks, spring hangers, support beam and rollers, becomes a self-sufficient unit. End thrusts can be increased by choosing a higher roller angle. End thrust is increased in the design as shown by pulling down on the ends of the beam by means of vertical anchor rods fastened to the foundation, increasing the down-force at the top of the wall to produce greater stability in the squareness of the total cross section. The extra down pull of the end anchor rod is measured by a compression spring in one end. Any slight changes in the length of this spring and of the hanger support spring give a direct measurement of any slight displacement that may occur in service.

Figure 7:
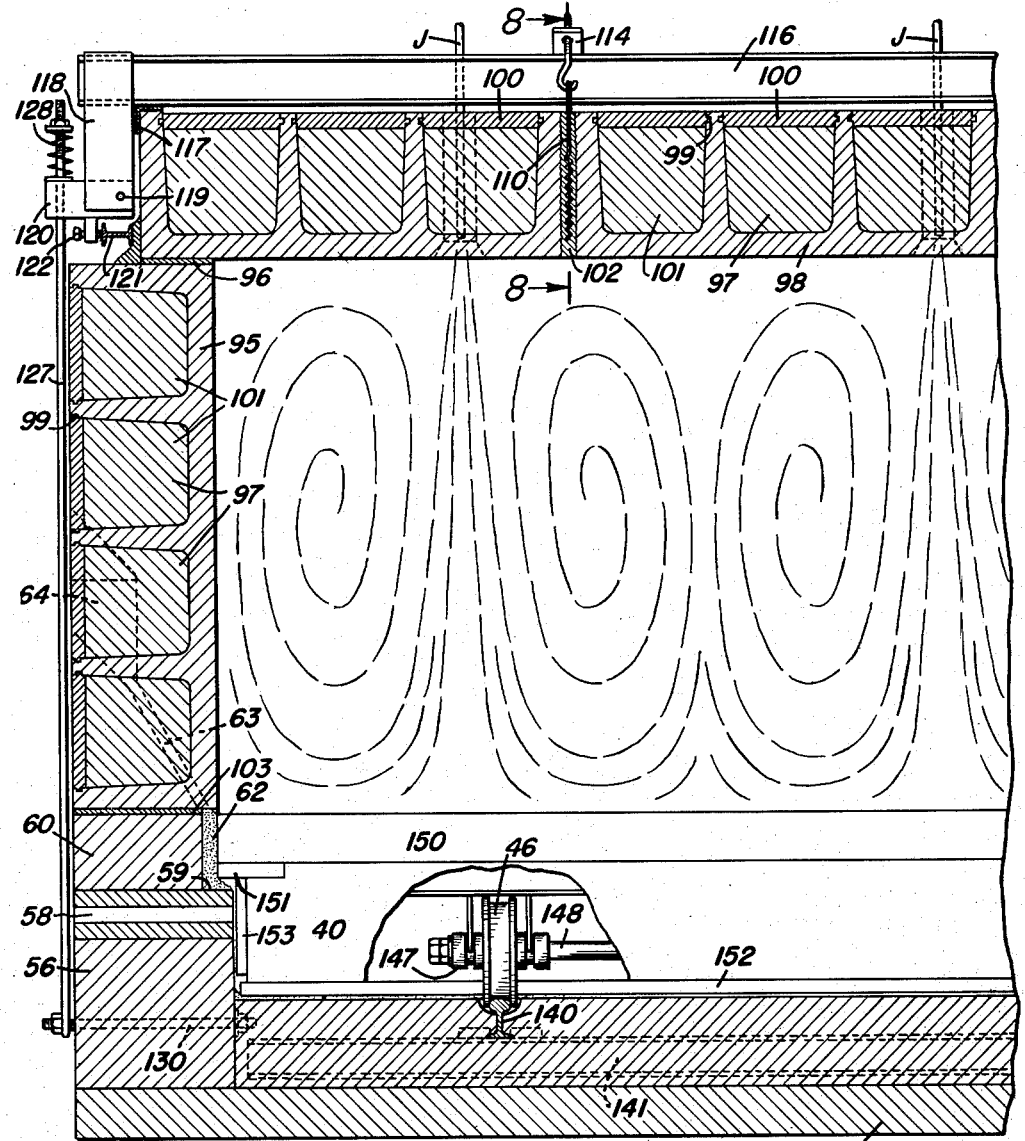
Fig. 7 is a fragmentary transverse section showing a modified construction of kiln, the section being on a somewhat larger scale than the section of Fig. 4 and showing fragmentarily a kiln car therein; and illustrating diagrammatically, also, how the jets stir up and agitate the gases in the plenum spaces between cars.
Figure 8:
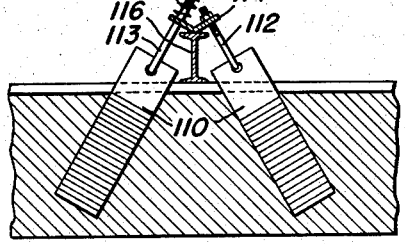
Fig. 8 is a section on the line 8—8 of Fig. 7, looking in the direction of the arrows and showing a modified form of crown suspension.

In the modified tunnel construction shown in Figs. 7 and 8, crown sections 98 are bedded in place on the top of the side wall units or sections 95, the walls and crown being connected by poured refractory joints 96. The base of this tunnel may be of the same construction as previously described, the walls being bedded on the bench walls 60 by poured refractory joints 103.

The wall and crown units, or sections 95, 98, are a special feature of this modified kiln structure. They are relatively large precast units in the order of sixty-eight inches high, forty inches long, and eighteen inches thick in the particular kiln design herein described. These side wall sections, and crown units are made of a castable refractory body cored out by the use of deep cores, to form large pockets 97 comprising approximately half the volume of each unit or section, leaving an inside wall, three inches thick. The pockets are cast with a slight groove 99 around the inside lips of the pockets. After a section is cast, and the forms and cores are removed, the cored pockets are filled with light weight, refractory, highly insulating material 101, such as vermiculite or diatomaceous earth, and then struck off. The loose insulation is then pressed down, say 1"; and light weight castable refractory 100 is then poured into these shallow depressions and the grooves 99 and struck off flush. Reenforcement wire (not shown) may be dropped into the casting mold to reenforce the thin-walled edges for safe handling.

The units 98 are mounted so that the pockets are directed outwardly, with the light-weight material 100 at the outside, or room side, as shown in Fig. 7. Side and crown units or sections so made are internally insulated. The joints 102 between corrugated ends of the crown units 98 are wide enough to be poured with castable refractory having embedded therein refractory metal or ceramic hangers 110 to hold up the crown. The side and crown units, together with the sealing joints for the crown units, provide the structural strength and stiffness of a complete box. Ventilation holes may be used along the hangers to reduce their temperature, if desired.

Hanger bolts 112, 113 (Fig. 8), which support the hangers 110 in each joint 102, carry the weight of the crown up to equalizers 114. One of these bolts may be rigid with its equalizer; and the other 113 is supported by a spring 115 by which the uplift can be measured to match the load or as desired. The equalizers, which are angle irons, rest on a cross beam 116; and each cross beam bears on corner angles 117. These corner angles rest on the outer ends of the crown units or sections 98.

The ends of each cross beam 116 are extended beyond its supports 117; and a pair of stiff plate strips 118 is welded to each end of each beam to form clevis-like dependent brackets that provide fulcrum or pivot points 119 for bell cranks 120. These bell cranks provide means of applying opposing horizontal thrust forces to the ends of the crown units 98, through buttress beams 121 and adjusting set screws 122. The beams 121 are bedded on refractory concrete poured into the angles between the side walls 95, and the crown units 98. The setscrews 122 thread into the short arms of the bell cranks and engage the beams 121. Vertical rods 127 anchored into the foundation by anchor bolts 130 in the benches 56, pull down on the bell cranks through coil springs 128 which engage the upper faces of the long arms of the bell cranks. By means of these springs, measured forces are applied to the bell cranks. If a force of 2000 lbs. is applied to the two to one bell cranks 120, balanced known thrust forces of 4000 lbs. are applied to the ends of the crown units 98, holding them tightly together at the joints 102 and holding the crown units tightly to the wall units 95 with a force of 2000 lbs. plus the weight of the crown units and the crown draft load. The force due to draft suction on the walls is met by this tight bond friction between the wall and crown units.

It will be seen that these chosen thrust forces including the inward force of the draft at the top of the side wall, all applied near the lower side edges of the crown units, may be made to support the crown in much the same way as a brick tongs picks up a row of bricks. The horizontal thrust forces hold the joints in the crown tightly together at all times so that the hangers 110 embedded in the joints can never become loose. At the same time there can be no relative motion between crown units 98 at the joints 110 which always bear flat and true so that the bottom of the crown remains flat and true. This is in contrast to the rise and fall of a sprung arch, as the temperature rises and falls.

In the present invention these stable relations between parts, with very slight expansion and contraction and no articulated movement, provide a determinate durable structure. The wall and crown units are fully exposed to inspection. They can be coated by a sealing compound and kept tight against unwanted infiltration of air although negative pressure or suction is present throughout the interior of the tunnel.

The novel mechanical construction holds the kiln structure compactly yet flexibly with less weight of steel than required for the conventional indeterminate and shifting buck-stay-and-sprung-arch construction.

Referring to Fig. 4, the assembly of tracks 140 and ties 141 on the foundation 55, is blocked up by wedges 142 and anchored in precise alignment as well as level position. Then concrete is poured so as to embed the ties up to 1" from their tops. After setting, more concrete is grouted under the full length of the flanges of both rails. Then a fill of very light weight aggregate with a little Portland cement is finally poured and screeded off flush with the tops of the rails to provide insulation to ground. This insulation obviates the greater part of the thermal expansion of the concrete and of the steel rails and affords a more uniform temperature. A little heat in the kiln will be saved also by this insulation. The fill between the rails and to the benches 56, blocks, in conjunction with the scrapers carried by the cars, to which reference will be made hereinafter, the longitudinal under car movement of air. Since a positive method of cooling the kiln cars is provided, no dependence need be placed on the cooling effect of the ground or foundation.

A particular feature of my invention is the construction of the kiln cars 40. Each car comprises a tank-like steel-plate body 145 (Fig. 12), with transverse recesses 146 underneath it at its opposite ends for the wheels 46, bearings 147, and axle 148. One of the wheels of each axle is preferably double-flanged, as shown, to provide guidance on one rail 140. The body plate 145 is filled with a poured refractory body slab 144, strengthened in the flat bottom of the car by reinforcing metal mesh or steel I-beams (not shown).

The refractory car top may be poured as a monolithic unit by inverting the car body on a flat surface and pouring the refractory material into the car through the inverted open car bottom. Heavier refractories are poured first, and gradually lighter type castable is added, the proportion of lighter type castable being increased until all light type castable is used. At the finish of the pour, reinforcing mesh is bedded into the slab; and the slab is struck off. The different, graduated layers of refractory in the car are indicated diagrammatically by dotted lines in Fig. 12 and are designated 144, 154, and 150, respectively. Cars of this type can be made of much less weight of steel and of refractory, and are much better insulated than previous kiln cars. They are lighter; and the cost is much less per square foot.

Because of the larger proportion of extremely light weight castable and the thickness of the slab, the conductive constant is extremely low per square foot of car top area, causing perhaps ¼ to ½ of the heat loss per square foot compared to current practice. Since no excess concentrated intermittent temperature is applied to the car top by side burners and pre-heat burners, the car tops and also the refractory in the walls and crown are saved from the destructive conditions present in conventional tunnel kilns.

The metal body of the car is extended at its opposite sides to provide car top extensions 151. These extensions overhang the sand seal ledges 59 (Fig. 4) as the car travels through the kiln. The shallow space between the flat car bottoms and the rails 140 is baffled by a scraper 152 of angle iron, that extends across each car beneath its bottom at or near its middle point as clearly shown in Fig. 12. This baffle or scraper 152 barely clears the floor and the tracks 140, to minimize longitudinal flow of gases under the several cars of the train. Baffles 153 (Fig. 4) are also secured at the opposite sides of each car to closely engage the adjacent side walls of the kiln to cut down longitudinal flow of gases between the cars and the kiln walls.

The ample side clearance spaces between the car top extensions 151 and the kiln walls (Fig. 4) are filled with sand 62 to make sand seals. The elevated hot sand seals thus provided prevent hot tunnel gases from circulating downward, alongside the metal car body. The cars are moved a full car length each car schedule interval and during this movement a few grains of sand may be crowded out of the open-bottom sand seals and fall to the bottom corners of the kiln to be pushed along by the baffle scrapers 152 to a receiver (not shown) at the exit end of the kiln. No sand, however, gets over to the nearby rails 140 which remain clean and free from grit. Additional short or stub scrapers (not shown) can be used if required.

The sand seals are fed near the entrance end of the kiln from hopper pockets 64 (Fig. 4) cast at opposite sides of the kiln into the joints 67 between wall units 65. A high-angle feeder tube 63 delivers the sand from each hopper pocket to the associate sand seal space. Tests have shown that the loss of sand is so small that, although more feeders could be used, only two feeders in each wall will usually be needed. One feeder is located, as stated, near the entrance end of the kiln; and the other feeder in each wall is located about half way through the kiln, just ahead of the fire zone to carry the remainder of the way. Toward the end of the cooling zone the sand can be allowed to peter out to a low level without harm. Tests have also shown that the frictional drag per foot of this open-bottom sand seal is moderate and since the kiln is short, with relatively few cars, the pusher pressure required because of sand seal drag resistance, is small.

The metal sides of the car instead of being overheated by hot gases are effectively cooled to the desired temperature by allowing room air to flow in through cooling ports 58 (Fig. 4) in and against the sides of the car.

The hot vertical sand seal is an important element in the design of the present kiln. Its effectiveness is insured by the car body which is designed to scrape the tunnel at the top rail level with the baffle scraper 152. The additional baffles 153 attached to the sides of the car to fill the side clearance spaces, assist in more completely cutting off longitudinal flow of gases under the car top.

The sides of the refractory car tops are fully supported on the air-cooled metal extensions of the car body, which overhang the sand retaining ledges 59 with liberal clearance comparable with the width of the sand seal clearance.

The height of car shown is less from the rail to the top of its heated car deck, than in previous cars. Although it has approximately three times the area and capacity of the usual kiln car, it is of about the same total weight and it is three to four times as well insulated against heat transmission loss per square foot of area.

Each car is provided at opposite ends with bosses 143 which serve to space the cars slightly from one another to permit flow of air between successive cars.

A modified form of car 40' of even greater reduced height as compared with that just described, is illustrated in Figs. 24 and 25. This car is similar to that previously described except that the transverse pieces of the frame adjustably carry threaded studs 155 which are secured to the car by lock nuts 156. The lower end of each stud has mounted thereon a slip shoe 157. This shoe comprises a bar 158 of steel to which there is riveted a porous metal sliding face plate 159 adapted to slide along the top of one of the rails 140 comprising the track. The face plate 159 may be made of porous metal impregnated with graphite or molybdenum compounds; or it may be porous and filled with lubricants. Such materials have very low coefficients of sliding friction and may be used with or without oil.

In this construction the rails are provided with continuous side guides 160 through the length of the tunnel. These guides are secured to the rails by bolts 161 and are spaced from the rails by spacers 162. At the ends of the tunnel, the cars can be slid sidewise between the tunnel and return tracks.

There are four skid shoes for each car. By using four skid shoes in place of wheels, the cross pockets for housing the wheels, bearings and axles of the design of Fig. 12 can be eliminated; the steel frame can be made still simpler, lighter in weight, and lower in cost. This form of skid car with hot sand seals at the sides and fully cooled around the sides and bottom presents a new type of thick fully-insulated slab unit suitable for a so-called "slab" kiln. This form of skid unit sliding on fully lubricated cool rails is in striking contrast to the usual thin, fragile, refractory plate unit often heated below and grinding along on unlubricated hot ways with destructive friction and abrasion. This new skid unit can also be used in place of known complicated "walking beam" equipment.

The new skid shoe units of the present invention can be pushed off the kiln track onto a flat plate flush with the floor instead of onto a transfer car with its sunken transfer pits and cross rails. The skid units or skid car may then be pushed sideways to line up with a return track and then pushed along the return track. Besides simplicity and low cost, the skid shoe construction has the advantage that the return rail may be run over freely without jar by rubber-tired lift trucks. If it is desired to preserve the direction of motion and the same contact pressure between the ends of the cars, the skid shoe unit can be slid around a half circle between the kiln and return tracks.

Each of the cars 40 or 40' is adapted to carry open work settings, as of bricks B (Fig. 11) for horizontal flow of tunnel gases, or to carry tile pipe P (Fig. 4) vertically where generally vertical serpentine flow of tunnel gases through the pipes is desired.

The advantages of a low car construction are possible largely because of a much better sand seal since I locate the vertical sand seal at the top edge of the car between the refractory car top and the wall of the kiln. A type of sand can be chosen which will not stick together but will remain granular at any kiln temperature.

As previously stated, the tunnel shown has twenty-four stations. The first five of these stations are drying stations where the ware received from the extruder or other shaping machine is dried from its residual moisture.

The side walls of the tunnel sections comprising the drying unit may be of the same construction as in the kiln portion of the tunnel. However, instead of using a flat crown, each of the drying sections is covered by a hood 170 (Figs. 1, 9 and 10) which may be of any suitable construction.

The five units in the drier zone are compartmented by vertically movable blades or partitions 165, that can be raised during indexing movement of the cars and dropped into place again. Where the settings are stacked to leave plenum spaces at the ends of the cars, spaces are left between each end of each setting and the adjacent dropped partition for the rapid, repeated circulation of the drier atmosphere around and around.

Mounted in each hood 170 is a shaft 172 on which are secured two propellers or fans 173. Also mounted in the hoods 170 may be one or more conventional heaters 174. The fans 173 serve to circulate the heat from these heaters, and the drying air.

The hood 170 at the first drier station S-1 (Fig. 1) has a pipe 175 communicating with it for entry of outside room air into the drier when a damper, which is in the pipe 175, is opened by operating the handle 177. The hood 170 of the first drying station S-1 is connected with the hood 170 of the second drying station S-2, and the hoods of succeeding drying stations are connected by ducts 178 which communicate at one end with the preceding hood 170 and at their opposite ends with the following hood 170. These ducts 178 are open for entry of air therein when the damper 176 of the station is opened by the respective handle 177. The shafts 172 in the several hoods and the fans 173 carried thereby are adapted to be driven from any suitable source of power by pulleys 179 which are secured to the shafts.

In the described arrangement of the drier, room air is drawn into the entrance end 175 and through the successive controlled inlet dampers 176 to lower the humidity of the drier atmosphere section by section, as desired. In the drying operation fresh air in limited quantity as required is allowed to flow through the air supply ducts into the drier sections, adding to the drying properties of the heated air in the sections; and successive sections are preferably heated to progressively higher temperatures. Volumes of water vapor are therefore formed in the drier sections, and join the cumulative flow from the entrance end of the drier to the stack. This, then, constitutes a parallel flow heat exchanger in contrast to the principle of counterflow which has usually been used in drier designs. Further than this, in operation, the direction of rotation of the fans 173 is preferably periodically reversed.

By the use of general parallel flow with frequent reversals of the fans 173 in each stage, and a high temperature difference between the air and the product, the drying ware can be safely and quickly raised up to a temperature at which it will actively expel its moisture, including residual heart moisture, to final dryness or essentially to constant weight. If the temperature of the surface of the ware has been brought up to 250° F. or higher in the preliminary stages, then the final car in the drier zone can be used without further addition of heat and without fans to complete the drying of the heart moisture.

The rapid circulating flow of atmosphere in each drier section permits the addition of heat at each stage by open direct burners using low grade fuel. The preferred arrangement of drier fans in tandem causes the same flow conditions and turbulent mixing to occur in either direction of flow when the fans are reversed.

The outlet ends of the ducts 175 and 178 register with the spaces between the two fans 173 of each drying section, and so do the inlet ends of the ducts 178. This insures introduction of heat and fresh air into the center space between the two fans 173 of each drier unit and assures that concentrations of heat and fresh air will be avoided. This also allows the very practical advantage of locating the drive pulleys 179 and their bearings outside of the housings 170 and the drive motors can be located beyond the sides of the drier for proper ventilation.

The sixth station of the tunnel has a hood 180 over it on which is mounted a fan F which sucks gases from both the drier and the kiln proper and which discharges them to atmosphere through the stack 185 when the damper 181 in the duct 183, that connects with hood 180, is opened by the damper handle 184. The side walls of this sixth station may be made like the side walls of the kiln proper. In fact, the side walls of the tunnel may, in effect, be straight-lined and monolithic from end to end.

Due to the method of loading, there is a plenum space in each station of the tunnel in which the gases for drying, or preheating, or firing, or cooling, can be agitated and thoroughly mixed to insure uniformity of treatment of the product while it is in each station.

The product to be treated is so stacked as to allow the desired circulation of air and the tunnel gases through it.

Figure 9:
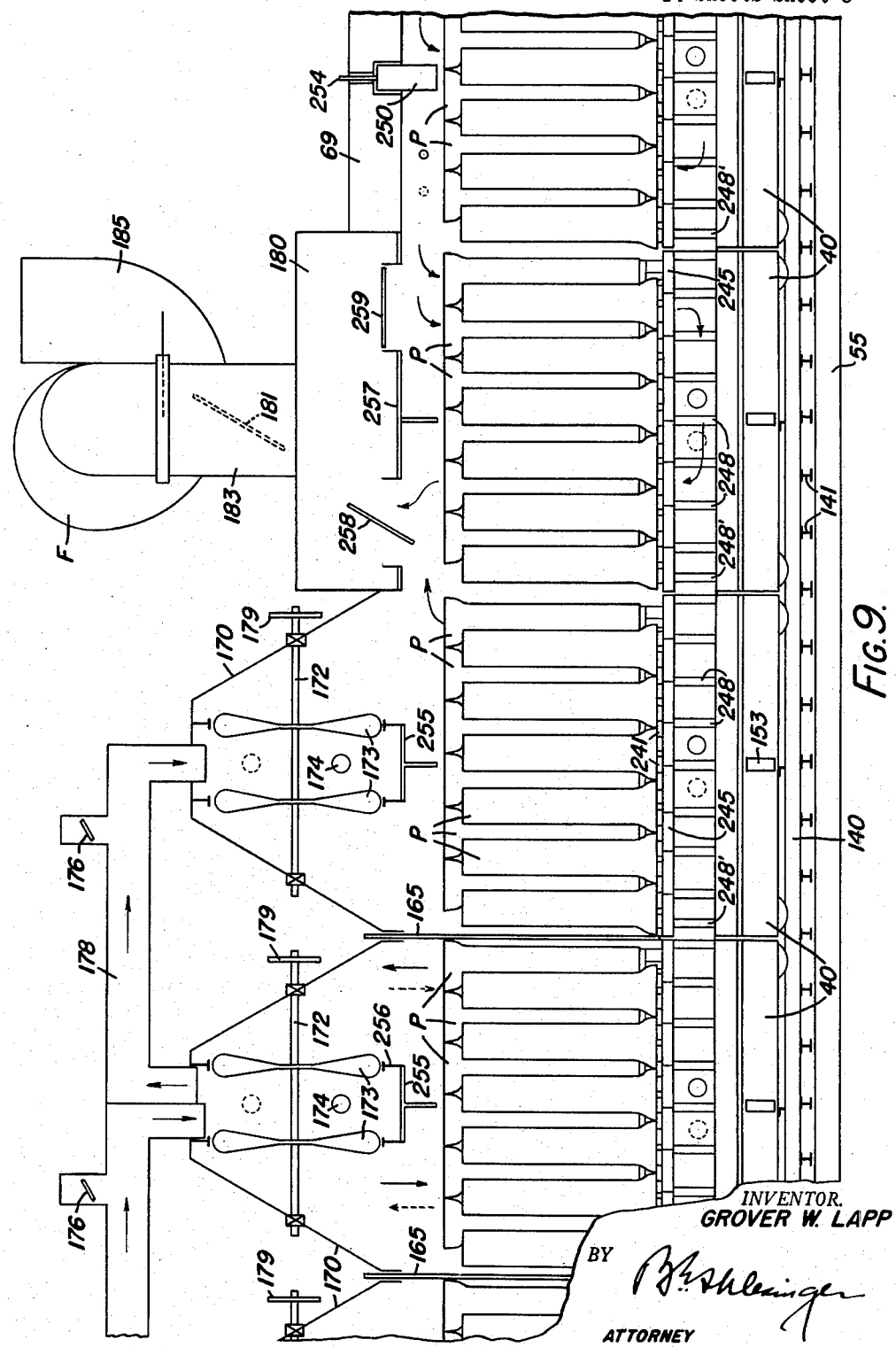
Fig. 9 is a more or less diagrammatic fragmentary longitudinal section through adjoining portions of the drier and kiln sections showing diagrammatically how the gases circulate when pipes or the like are being treated with vertical serpentine flow of the kiln gases.

When tubular pipe P is to be baked, it may be stacked on the cars 40 as shown in Figs. 4 and 9. Each pipe is here mounted at its lower end upon a ring 240 (Figs. 4 and 14) that is in turn mounted upon a four-armed spider 241. The heights of the spiders may be varied, as shown in Fig. 4 as to permit stacking the pipes P as close to one another as possible without interfering with one another.

In the case of piping, a superdeck is employed on the cars 40, such as shown in Fig. 13 and denoted at 245. This consists of generally rectangularly shaped members that are porous having holes 246 therethrough, and that have recesses 247 in all four sides so that the air or gases can pass between them and through the porous structure. The superdeck units are mounted upon struts or posts 248 carried on the top layers of the cars 40.

Where pipe is being treated, the air in the drying zone will circulate down through the pipe through the superdeck on one half of a car and up through the superdeck and the pipes on the next half car. The superdeck baffles 248' on adjacent cars may be set as shown in Fig. 9, so that the undercar cooling air will mix with the downward part of the vertical serpentine flow. Baffles 248' are of the same height as posts 248. Baffles 255 with intermediate depending portions and suspended from beams 256 may then be used in the drier sections to insure vertical movement of the drying atmosphere. Baffles may also be secured or cast to the crowns in the kiln section, as shown at 250 in Figs. 4 and 9, supported by rods 254 to insure the desired serpentine flow.

When the fans 173 run in one direction they pull the drier gases at one side of the crown baffles upward through the ware on the rear end of the car and down through the ware on the front end of the car. Heat is added to the system in the fan housings 170 between the fans; and burner gases may be added also and mixed into the superdeck space by transverse oppositely directed burners and jets 174. Jets 174 are not shown in Fig. 1 for the sake of clearness in illustration.

In this way, heat may be added before each pass through the ware to prevent condensation on the product at the exit end of the passes. The fans may also be reversed periodically causing the pipes or ware to be equally dried top or bottom or at both ends.

When the drier atmosphere consisting of heated air and water vapor above its dew point is drawn through the mass of setting having a lower temperature, the gases are reduced in temperature and increased in moisture, tending to arrive at dew point or saturation part way through, beyond which part there is condensation of moisture on the ware in the trailing end of the setting. If the fans are reversed at sufficiently frequent intervals, and the trailing end of the setting has been previously left in a warmer drier condition, condensation will not occur before the fan is again reversed.

The suction of the fan F, regardless of fans 173, always causes cumulative flow of the dry air admitted in any stage, together with its volumes of water vapor evaporated from the ware, from the entrance end of the drier to the stack 185 in the direction of the general movement of the cars. The removable vertical partitions 165 between the cars 40 segregate the drier stages with their considerable differences in temperature and humidity. Rapid drying can be accomplished with safety in this vertical type drier because rapid vertical circulation of the drier atmosphere is provided inside and outside of the pipes P, the air being controlled in temperature and in humidity, and made to produce uniform effects by frequent reversal of flow.

The humid drier atmosphere, consisting of dry air with a large proportion of dry superheated steam, is exhausted to atmosphere by the tunnel kiln stack fan F.

Figure 10:
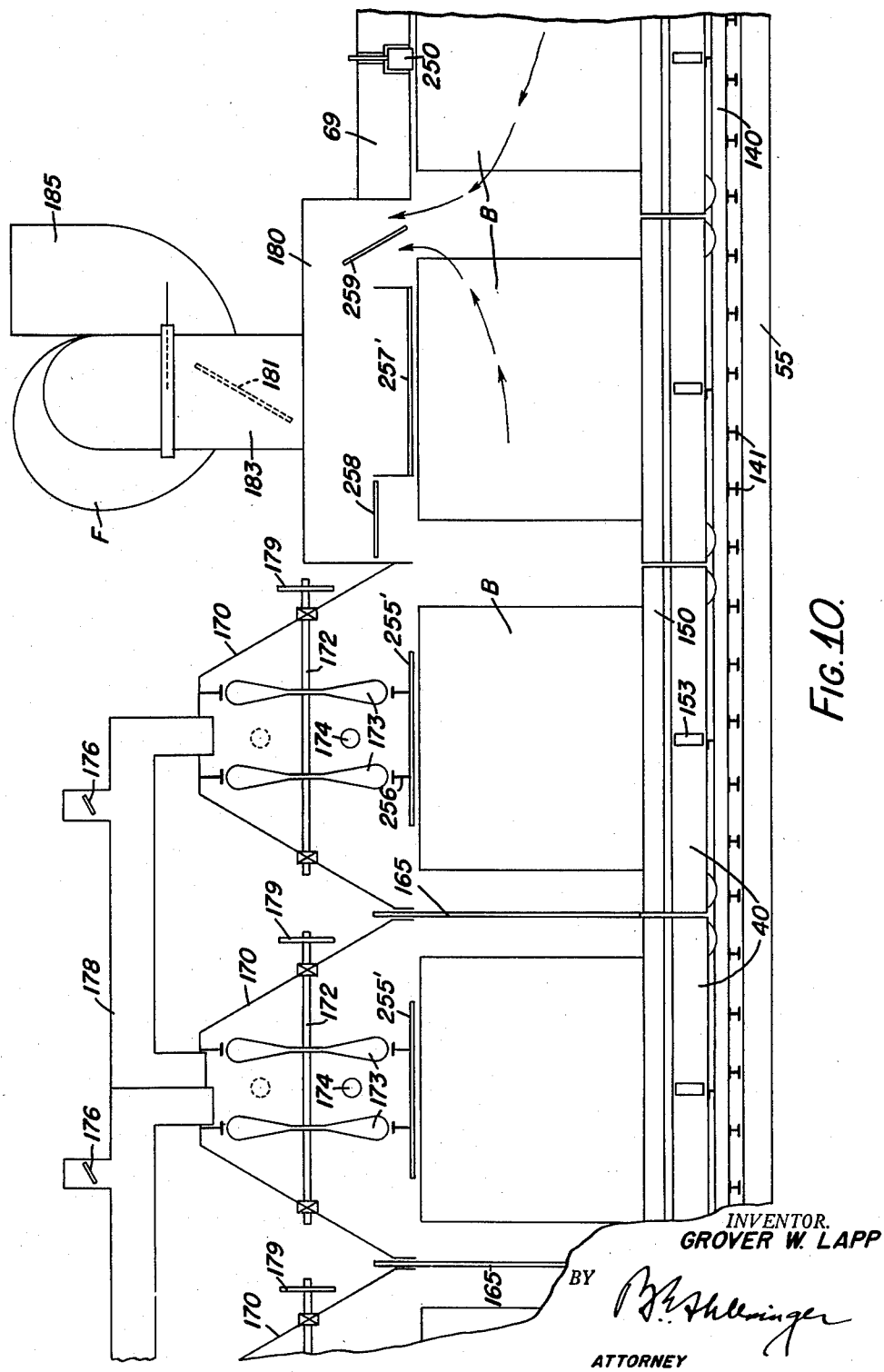
Fig. 10 is a fragmentary longitudinal section taken through adjoining sections of the drier and kiln and illustrating how the gases may flow when a product such as bricks are stacked for horizontal flow of gases.

Baffles 255' in the straight-line, horizontal-flow drier will be provided in the drying zone beneath the fans 173, as shown in Fig. 10, close to the ware, in order to insure circulation of the drying air through the product.

Instead of stacking them for horizontal flow, oversized types of building bricks extruded with thick walls and large center holes may also be stacked to good advantage to permit vertical flow of the drying and tunnel gases. The bricks may be stacked with holes vertically in alignment with very small space left between vertical stacks, providing access of heat outside and inside.

The type of setting plays an important part in the results of the tunnel kiln operation. The straight-line, horizontal-flow kiln requires openness to the flow of gases in the longitudinal direction only. A line of thirty cut brick extruded from the auger machine with holes may be lifted by a vacuum plate or other means and placed in an undisturbed row lengthwise of the kiln car. Successive rows of thirty brick about six feet long spaced from each other ½" gives a flue space of 6% in addition to the 25% permissible in each brick, or a total of 31% aperture through the setting itself. In the case of horizontally set tile the aperture is much greater.

Clearance spaces to walls and crown in the kiln section of the tunnel gives about 7% additional flue space or 38% before the ware is dried. Drying shrinkage adds about 6% clearance, giving about 44% total openness as the dried ware enters the preheat tunnel. For a tunnel of about seventy square feet area, 44% figures over thirty square feet total flue area.

An advantage of this type setting is the fact that a very large number of bricks can be set on a car, reducing the number of cars per day for a given capacity, and decreasing the temperature time gradient. The chief advantage of hacking bricks on the kiln car in straight rows directly from the extrusion machine line is a simplicity of automatic mechanical handling. Another advantage is the broad area bearings between courses in the stack, so that faces of the brick are unmarked as in cross-hacking on limited bearing areas. Another advantage of the straight row setting is the drying of the shrinkage water, chiefly from the interior surfaces of the brick, thereby wicking soluble salts to the interior surfaces and helping to avoid evaporation and efflorescent deposits on the exterior faces of the bricks. If it is desired to cross-tie the upper courses of this straight row type of setting, a few courses are offset alternately as required.

To insure complete drying in the vertical flow tunnel, the station S-6 (Fig. 1) which is associated with the stack 185 may have a baffle 257 (Fig. 9) with a depending portion placed close to the ware, and manually adjustable dampers 258 and 259. When damper 258 is closed and the damper 259 is open, then the air must travel completely through the work at station No. 6 before it goes out through the stack 185. In the straight-line, horizontal flow kiln, baffle 257' (Fig. 10) serves the same purpose between dampers 258 and 259.

The most distinctive feature of the kiln of the present invention is the use of plenum spaces with turbulent jets to equalize the temperature of the gases in such plenum spaces. This makes it possible to add heat directly to the tunnel at any concentration or flame temperature, or to scatter gases or atomized fuel to maintain the desired general temperature evenly distributed over the entire cross section in that particular space before it is drawn through the setting by the stack fan.

In a similar way, cold air can be admitted at any cross section and actively scattered by the turbulent jets over the whole cross section to peg the temperature for gradient control purposes.

When the cars are indexed intermittently, they are moved forward quickly, and left in their newly indexed positions for predetermined periods. During movement of the cars the temperature gradient throughout the kiln is in effect pushed forward a full car length and gradually creeps back to the original position during the period of dwell. The injection of hot or cold gases in considerable amounts for gradient control at a certain temperature level may be accomplished with minimum disturbance by providing the flow of supplementary gases in two plenum spaces, shifting the flow from the rear position to the forward position during car movement, and gradually modifying the flow from the forward space back to the rear plenum chamber during the long period of dwell. The turbulence-producing jets at each cross section, whether or not hot or cold gases are being added, cause the tunnel gases flowing through each plenum space to be remixed to uniformity after the variable streams emerge from one setting and before they enter the succeeding setting.

When straight-line horizontal, or serpentine vertical flow of the tunnel gases is used, a pipe 190 (Figs. 2 and 3) for air or other gas under pressure is provided along the kiln proper. This pipe has jets J communicating with it and discharging high velocity room air, or high temperature blasts into the tunnel at some or all of the plenum spaces between the loads of successive cars, as may be desired. As shown in Figs. 2 and 3, the pipe 190 has an air compressor 192 communicating with it at its left hand end which is driven by a motor 193 and which supplies air to the pipe at the desired pressure, say 10 p.s.i.

A horizontal serpentine flow type of kiln is illustrated fragmentarily in Figs. 26 and 27. Here the plenum spaces 260 are provided preferably by spacing the side walls of the kiln further apart than in the previously-described embodiments of the invention; and alternate filler portions between the side panels 65 of these side walls are then made thick enough to extend at their inside surfaces close to the ware stacked on the cars, so that these alternate filler portions in effect act as baffles 261 between successive plenum spaces 260 on the two sides of the kiln. Preferably, the baffles 261 at opposite sides of the kiln are staggered relative to one another, as shown in Fig. 26, so as to get the desired horizontal serpentine flow of the tunnel gases.

Where the horizontal serpentine flow is employed the ware, for instance, bricks, is stacked to the very ends of the cars and preferably at the ends of the cars is stacked so as to present walls extending completely across the car for the full height of the settings. Thus the settings themselves may help to baffle and direct the flow of the tunnel gases in the desired horizontal serpentine path.

Otherwise, the structure may be as shown in Fig. 4.

Jets are provided to create turbulence, and/or direct burner gases, etc. into the plenum spaces as in the previously described embodiments of my invention. These are preferably disposed to direct the jets of gases vertically. The jets may be mounted in the bench walls of the kiln to direct the blasts upwardly into the plenum spaces 260. Preferably, however, the jets are placed in the crown of the kiln above the plenum spaces 260 to blast downward as shown in Fig. 27. Compressed air may be supplied to the jets through right angular ducts connected with manifolds, such as manifold 190 (Fig. 2), which extend along the sides of the kiln at the outside thereof.

The horizontal serpentine flow kiln embodies the basic principle of the present invention, namely, that of plenum spaces or chambers in flow sequence between settings of the product. Into these plenum spaces burner gases, or hot air, or cold air can be scattered and mixed with the ambient gases by means of jets for maintenance and control of the temperature gradient. As in the vertical serpentine kiln used for firing pipes, the burner gases or other supplementary gases can be introduced into the effluent stream of tunnel gases as they leave the setting. Opportunity is had, therefore, for scattering and mixing the gases to uniform temperature before they again enter the setting at a point remote from the place at which they were injected.

The horizontal serpentine arrangement has the advantage that a superdeck is not required. Furthermore, no space is required above the setting between the crown and the setting. Hence the kiln can be made of lower height.

A further feature of the horizontal serpentine kiln is the fact that the baffles are stationary parts of the kiln walls, making possible continuous movement of the cars if desired. The cars may, however, be moved intermittently also, as in the straight-line horizontal-flow kiln.

Another advantage of the horizontal serpentine kiln is that the baffle spacings may be made alternately one car length, or half a car length, or any length desired independently of car length, or tunnel width. For this reason the flow path can be made long and narrow, or short and wide, as desired. Furthermore, a short kiln can be constructed having a long flow path if the product has a very large or open aperture ratio as in hollow building tile placed crosswise of the car.

If the cars are moved continuously, the direction of gas flow is reversed in that part of the setting as it passes a baffle.

Moreover, a fan may be placed on opposite sides of any baffle to boost the rate of flow around the associated loop of flow; or by actually reversing the fan the direction of flow may be reversed as previously described in connection with the drier portion of the kiln.

Because of the ease with which the flat crown can be supported for any span or width of kiln, the additional width of crown required by the side spaces in the horizontal serpentine kiln is not hardship.

The jets J used throughout the tunnel may take various forms.

Figure 15:
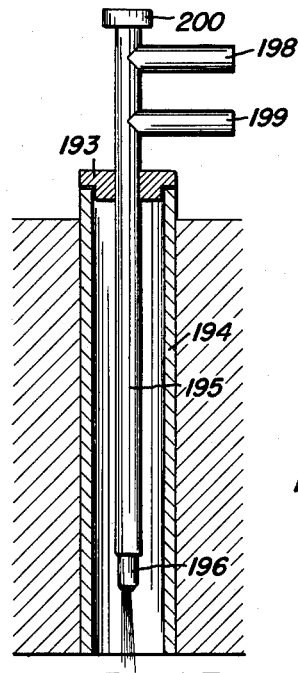
Fig. 15 is a vertical section showing one form of fuel jet which may be employed in the kiln and the mounting thereof.

In the firing zone of the tunnel and in regions where the temperature is safely above ignition temperature, the jets may be made as shown in Fig. 15 and comprise a smooth bored tube 195 which adjacent its tip is threaded, or grooved as denoted at 197 to break up the fuel. This jet is connected at its upper end to the pipe 190 by a duct 198; and it has a feed tube 199 at one side, communicating with its bore, through which oil or other fuel may be fed. The compressed air from the pipe 190 forces the mixture of air and oil, or other fuel, at high speed and under pressure into the opposed plenum space in the kiln, where it is ignited. This burner may have a removable cap 200 which will permit insertion of a cleaning rod for cleaning the burner. It may be mounted in a removable holding disc 193 that is secured in a sleeve 194 that is embedded in a joint 71' (Fig. 5).

Figure 19:
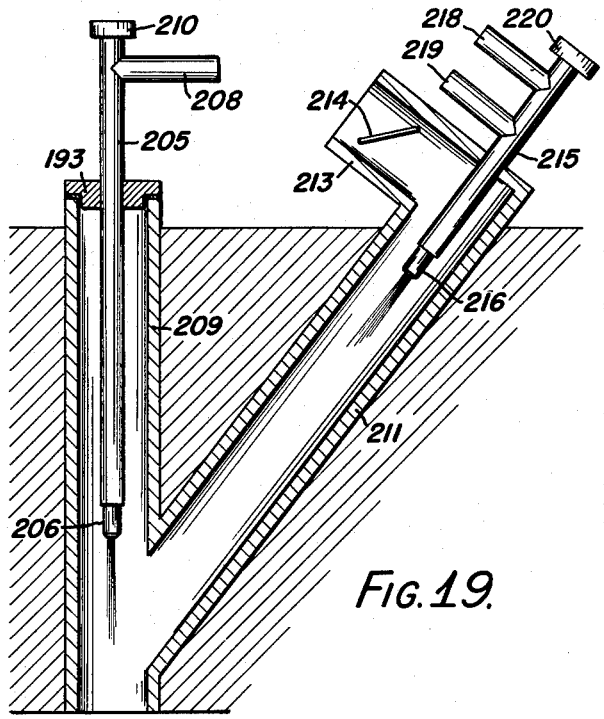
Fig. 19 is a vertical section showing a modified form of combustion burner for delivering hot combustion gases and for diffusing the hot gases throughout the intersetting or plenum spaces of the kiln.

Another form of burner which may be used in the drying zones and in the preheat zone and in the cooling gradient, where there is a partial temperature, is shown in Fig. 19. This comprises an air jet 205, which extends through a combined cap and bearing 193 into one arm of a Y-shaped tube 209. The air jet has a nozzle at 206. It is capped by a cap 210 and is connected with the duct 190 by a duct 208. In the other arm of the Y member 211 there is mounted a burner tube 215 similar to the nozzle 195, and connected by a duct 218 with pipe 190, and connected by duct 219 with the fuel supply. The nozzle of this burner is denoted at 216 and may be similar to the nozzle 196. The arm 211 has a right angular portion 213 which opens to atmosphere and in which there is mounted a damper 214 which is manually adjustable.

The burner 215 is a regular burner. The tubular arm 213 and damper 214 give volume so that the tube 211 will not burn out. The air flowing from the jet 206 acts as a temperature reducer but gathers the heat which it entrains into the opposite plenum space of the tunnel heating medium. The combustion burner 215 delivers hot combustion gases, and the jet 205 diffuses the hot gases throughout the opposed intersetting or plenum space. As stated, this combination is used for scattering heat from a high temperature source safely into a low temperature space, such as in the drier and other regions below the ignition temperature of the fuel.

Figure 17:
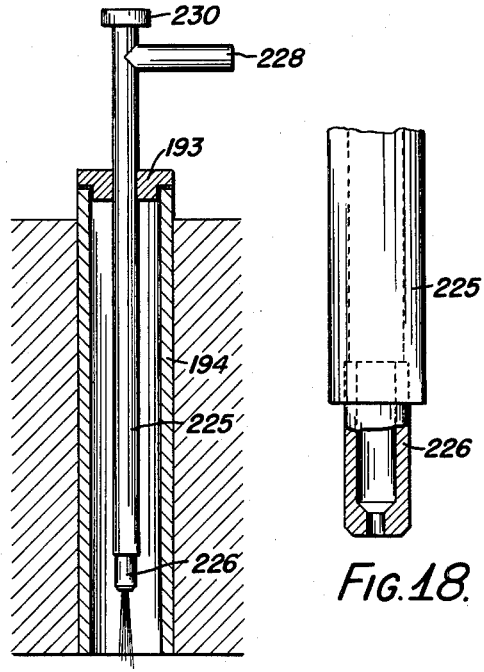
Fig. 17 is a view, similar to Fig. 15, showing a plain pressure air jet for mixing gases in the transverse plenum spaces of the kiln.
Figure 18:
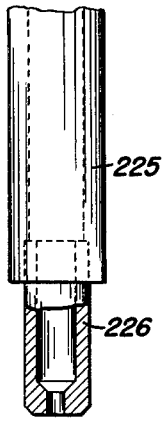
Fig. 18 is an enlarged view, partly in section, illustrating details of the nozzle structure of the jet of Fig. 17.

A plain air jet, such as may be used in the cooling and preheating zones, is shown in Figs. 17 and 18. This jet comprises a tube 225 which is mounted in a combined closure and bearing member 193. It is connected by a duct 228 with the duct 190 and is capped by a cap 230.

Figure 20:
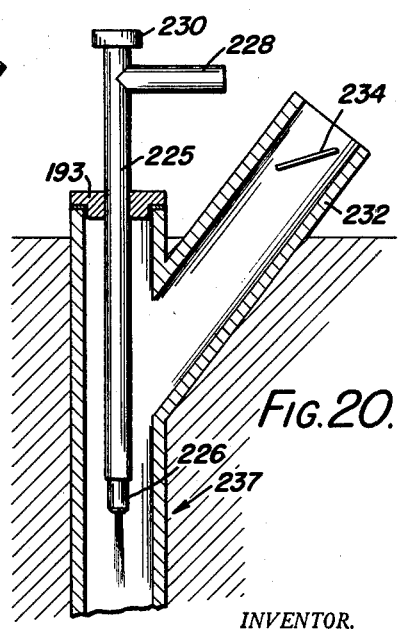
Fig. 20 is a fragmentary vertical section showing another modified structure in which an air jet is employed to mix cold air energetically in a plenum space.

Another form of air jet that may be employed is shown in Fig. 20. This comprises a jet 225 which may be of the same structure as shown in Figs. 17 and 18, but which is mounted in one arm 229 of a Y-shaped member whose other arm 232 may be open to atmosphere. The flow of air into the other arm 232 may be regulated by a damper 234 manually. Cold air flows into the arm 232; and the air jet 225 forces the cold air out of the tube 237, mixing it energetically with the air in the opposed plenum space so that its temperature is equalized before hitting the product.

The kiln can be operated in various ways. Fig. 28 shows diagrammatically twenty-four cars C-1 to C-24 inclusive in the tunnel. A movable gate G is provided, as already stated, at the entrance end of the tunnel and movable gates or partitions 165 may be provided between the several drying stations. There are six cars in the drier zones with four cut-off gates 165, eight cars in the preheat zone, three in the fire zone, and seven cars in the cooling zone.

Fig. 29 illustrates diagrammatically one way in which the tunnel may be operated. In this figure and in Figs. 30, 32 and 33, the ordinates denote the twenty-four stations through which the cars progress from entrance to exit of the tunnel; and the abscissas denote the temperatures prevailing at the different stations. In Fig. 29, heavy line 320 denotes the temperature of the gas or atmosphere in the tunnel and heavy line 321 denotes the temperature of the ware. In the method of operation illustrated in Fig. 29 heat is applied only in the fire zone. The air is drawn from the exit end of the tunnel through the tunnel to the stack 185, and air is drawn through the drying zone also to the stack 185.

Fig. 29 is a diagram showing the simple temperature gradients which result when heat is applied at the fire zone only, namely, between stations S-14 and S-18. In this zone a temperature of approximately 2000° F. is attained. Zone S-6 is the zone in which the fan and the stack are located. The hot air in the firing zone, is therefore being pulled by the fan from the firing zone over the ware as the ware travels step-by-step from station S-6 to station S-14. Naturally the air is hottest adjacent the firing zone, and cools off as it circulates over the ware on its passage to the fan and the stack. Therefore, a gradual temperature gradient exists, the air falling in temperature as it moves from station S-15 to station S-6, while the ware itself is raised gradually in temperature by the effect of the hot air upon it, as the ware travels through this preheating zone. In the firing zone, of course, the ware has been brought up to the desired temperature, which is approximately the temperature also of the air. Since the ware is hot as it leaves the firing zone, it will transfer this heat to the air which has been drawn into the tunnel through the exit end of the tunnel. Of course, entering station S-18 the ware will be hottest. Hence, it will heat the air flowing over it most of all. As the ware moves from station S-18 to station S-19 and so on to the exit, it will be gradually cooled off by the air sucked into the exit by the fan and traveling through the ware. Thus the ware will gradually be cooled off through spaces S-18 to S-24, while the air will gradually be heated up to the soaking or firing zone.

As already stated stations S-1, S-2, S-3, S-4 and S-5 are the drying stations where the wet ceramic material is dried sufficiently to be preheated and then baked. The air travels through the ware in these stations back and forth through reversal of the fans 173. The heavy line 325 denotes the initial temperature of the ware in the several drying stations, while the dotted line 326 denotes the final temperature of the ware. The ware temperature in zone S-5 is slightly higher when the ware enters this station than when it leaves it to enter the preheat zone because of final evaporative cooling.

Fig. 30 illustrates an operational plan in which the temperature of the tunnel gases is boosted between stations S-9 and S-10 by addition of heat H to divide the preheat zone into two stages to cause quick rise to the 1000° F. level, then a slower rise of temperature through the oxidation range to about 1400° F., and an increasing rise up to the fire zone temperature. This figure also shows the effect of adding heat H just below the 1067° F. critical temperature of the product by dividing the cooling gradient into upper and lower ranges. This is done between stations S-21 and S-22. The top part of the upper range of the cooling zone is steeper where the plastic ware can stand fast cooling, the bottom of the upper range is flatter to favor the ware by a slower gradient through the sensitive range of cooling including the 1067° F. temperature. The lower cooling range has a high gradient for fast cooling through a safe region while slower cooling near the exit end of the kiln permits a corresponding lower temperature difference, lower ware temperature at the exit, and lower hot car losses, 330 denotes the temperature of the tunnel gases; and 331 designates the temperature of the ware.

By boosting the temperature between stations S-9 and S-10 (Fig. 30) with heat, time is allowed to burn out the carbon and sulphur from the ware. The carbon will be burned out faster. Heat is put in between stations S-21 and S-22 (Fig. 30) in order to slow down the gradient of change of temperature in the ware at the critical temperature 1067° F. In other words, between stations S-9 and S-10, the temperature of the air is boosted. This has the effect of raising the gradient through station S-9 and lowering the rate through station S-10 as compared with the gradient in Fig. 29, to help oxidation.

Fig. 32 shows the temperature gradients 340 and 341 of the air and ware, respectively, flattened through the critical 1067° F. range in stations S-10, S-11, and S-12 by the addition of cold room air at the upper end of this middle range above station S-12, and by the addition of heat between stations S-9 and S-10 at the lower middle range. Likewise Fig. 32 shows heat put in between stations S-21 and S-22, and a mass of cold air put in between stations S-19 and S-20, in order to get a more gradual gradient temperature through the critical temperature range. The addition of heat and cold air gives greater time delay in the preheat to burn the combustible materials out of the brick or other ceramic. If the sulphur and carbon are not burned out of the clay, then the gases created in the firing zone may cause the clay to bulge. Between stations S-12 and S-13 the room air depresses the temperature so that there will be more gradual passage of the ware through the critical temperature in the range of oxidation, discharge of chemical water, and expansion of free silica.

Fig. 21 shows how a bypass may be used to shunt the flow of tunnel gases around one or more cars in the fire zone, and to stop the flow of tunnel gases through the setting of product for the purpose of injecting fuel or other material to cause a strongly reducing, fume-laden atmosphere for the "flashing" or coloring of the product. The by-pass is here shown as applied in a kiln adapted to either horizontal, straight-line flow or vertical, serpentine flow of the kiln gases. Here the crown of the tunnel is raised, as denoted at A, over the fire zone stations S–16 and S–17, but may otherwise be of the construction previously described. In addition, there may be mounted a baffle 267 over the cars so that the space 268 will act as a duct. A right angular air jet 266 is directed from pipe 190 and over this baffle. The right angular air jet 266 will then propel the tunnel gases through the bypass 268, sucking them up from the plenum space S between the loads of cars C–17 and C–18. An air jet 265 also connected with supply pipe 190 and projecting downwardly toward the plenum space between cars C–15 and C–16 further helps this movement.

Figure 16:
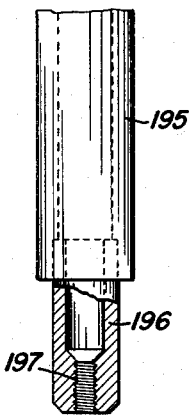
Fig. 16 is a fregmentary view, partly in section, on an enlarged scale showing the nozzle of the fuel jet of Fig. 15.

Fuel jets 270 are provided in the side walls opposite the space between cars C–16, C–17 to provide a reducing atmosphere for flashing the product in the two cars C–16 and C–17. These fuel jets are the same as shown in Figs. 15 and 16.

A bypass damper is provided as indicated at 269, which is raised to the full line position when the bypass is to be used, and which is lowered about the jets 265 when the bypass is not to be used. A valve (not shown) may be provided to shut off the jet 266. The jet J shown ahead of the flashing zone is a fuel jet and the jet J shown in the first cooling zone space after the fire zone, is an air jet.

A similar bypass can be used for gradient control in the preheat or in the cooling zone. By-pass jets, like jets 266 and 265, will propel the gases through the bypass to the desired degree.

By an alternative and preferred method, the control of the flashing operation may be made exact, and applied uniformly to a single car by providing stack or suction jets, or a ventilating fan, to suck out of the plenum space at one end of the car being treated, while fuel and/or coloring material are fed into the plenum space at the other end. By reversing the suction end and the feed-in end of the treated car, the setting may be thoroughly and uniformly "flashed" without discoloring the ends of the adjacent settings. While the suction is pulling reducing gases through the treated car, and out through the crown to the atmosphere, it is also pulling a slight protective flow of heated fresh gases through the two adjacent cars.

Fig. 22 shows how the structure of the horizontal, straightline flow or of the vertical, serpentine flow kiln may be modified for practicing this preferred method of "flashing" or coloring ceramic products. Here the flow of tunnel gases is stopped by closing the main stack damper, then adding fuel and/or coloring material in the space at one end of the setting to be treated, while withdrawing gases from the tunnel through a stack or other device at the other end of the setting. Here jets 275 and 276 are provided at opposite sides of the car C–17. Jet 275 is connectable through duct 277 to pipe 190 or other source of compressed air, and is connectable through duct 278 to a source of fuel supply and of supply of flashing material. Manually operable valves 279 may be provided for connecting the ducts 277 and 278, at will to the jet 275. Similarly jet 276 is connectable by duct 280 with pipe 190 or other source of compressed air, while this jet is connectable through duct 281 with a source of fuel supply and of flashing material. The plenum space between the cars C–16 and C–17 is connected to a stack 285 which is controlled by a damper 286, while the plenum space between the cars C–17 and C–18 is connected to a stack 287 which is controlled by a damper 288. Air jets 289 and 290, respectively, may be provided in the stacks 285 and 287 to provide forced movement of the air from either stack when the associated damper 286 or 288 is opened. The air jets are controllable by hand valves 291 and 292, respectively.

Stacks 285 and 287 are opened alternately. The solid arrows 295 show the paths of passage of the gases from setting W–18 through the setting W–17 from right to left and out of setting W–16 to the stack 285. The dotted arrows 296 show the "flashing" gases leaving setting W–16, entering the setting W–17 at the left end, and, with gases from setting W–18, passing out to the stack 287. Fuel jets are shown for firing and "flashing," whereas between cars C–15 and C–16 and between cars C–18 and C–19 air stirring jets are shown for mixing the tunnel gases and air between the cars.

Suction fans with cold air dilution may be used in the stacks 285 and 287 instead of the ejector devices 289 and 290 shown diagrammatically. Small volume and intensity are required to drift the "flashing" gases through the setting on car C–17 and out to stack.

As already indicated, 1067° F. (575° C.) is the critical temperature for free silica. There is always danger of cracking the ware by sudden expansion when a ceramic material containing silica is being heated and has to pass through this critical temperature, or when it is being cooled and has to pass in the reverse direction through this critical temperature.

Fig. 23 illustrates diagrammatically one way in which practical uniformity of temperature of the material is insured throughout the whole setting as it passes through the critical temperature state. Here the crown above one of the settings is removed and instead there is employed a hood 300. Mounted in this hood is a shaft 302 on which are secured two fans 303. The shaft is driven by a pulley 309 from a suitable source of power. Beneath the fans there is a baffle 311. Depending upon the speed at which the shaft 302 is rotated in one direction, the air is drawn upwardly over the baffle 311 and into the next setting to the left, reducing, or as shown by the arrows, even reversing the gas flow through the setting beneath the baffle. By reversing the flow, the heated air from the setting to the left can be carried backward through the setting beneath the baffle 311. Hence by alternately reversing the direction of flow, the temperature gradient can be kept flat and the temperature can be brought down promptly through the critical temperature 1067° F.

By putting moderate fan power in, the gases can be by-passed around a car. If more power is put in, the gases can be circulated backward, further aiding in bringing the ware throughout to an even temperature to prevent any cracking. This is an especially important feature in the case of flat slabs, such as tile. Flat slabs and other products can be made to have approximately the same temperature from end to end as they are cooled rapidly through the critical silica temperature range. This is most important after tile has been fired and vitrified. The same method can be used to raise temperatures rapidly with a flat temperature-length gradient up through the middle temperature range in the preheat.

Obviously the various control methods illustrated in Figs. 21 to 23 can be practiced also in a kiln with horizontal serpentine flow of the kiln gases, the by-passes, fans, etc., only being disposed at a side of the kiln instead of at the top.

Fig. 33 shows a way of operating the kiln in which the temperature gradients are modified by the use of bypasses, such as shown in Fig. 31 at 335 and in Fig. 23. When the flow of tunnel gases is diverted partly around the setting, the reduced flow through the setting causes a reduced rate of heating or cooling. Heat or cold air may be added to the bypass flow to combine the two methods of gradient control. 350 denotes the gradient of air temperature; and 351 designates the gradient of ware temperature. The temperatures of the air in the bypasses are denoted at 352 and 353, respectively.

For most ceramic products, of slight thickness, or small size, or low in organic content, or low in silica, or reasonably uniform in loading density, car by car, simple gradient control such as illustrated in Fig. 29 is all that is required. Detailed gradient control will be found unnecessary especially in a tunnel atmosphere having high concentration of free oxygen that is provided in my "convection" type kiln. In such uncomplicated cases, simple automatic damper control at the stack 185 may be used to hold the preheat stack temperature constant. Automatic temperature controls are used in the fire zone.

Only in exceptional cases will it be found necessary to use exit doors and dampers. In the usual case with the kiln of the present invention it is possible to allow cooling air to be drawn freely into the open exit end of the kiln, to proceed in full volume through the cooling zone, through the fire zone, where its temperature is raised to the required standard, then down the preheat gradient to the stack damper which controls the flow automatically to maintain constant preheat stack temperature. By leaving the exit open and extending the track, cars may be pushed out of the tunnel successively; and the exiting cars require no attention of the operator to exit.

Fig. 9 shows how the tunnel is baffled when the tunnel gases are to be flowed vertically through the ware, as, for instance, in treating ceramic tile pipe P. The pendant stationary baffles 255 placed in the hoods 170 of the drier zone and the stationary baffles 250 placed in the crown spaces in the kiln sections at the mid points in the car lengths causes the gases to flow downward through the hollow ware on the one end of each car, through the openings 246 in the superdeck 245, into the space between the superdeck and the car tops and upwardly through the openings in the superdeck and through the hollow ware on the other end of the car. On successive cars cut-off baffles are provided preferably at the end of each car which prevent gases flowing horizontally car to car in the superdeck space. In the kiln the gases flow down from the crown space above the leading half of a car through the hollow ware, and the superdeck into the lower space, flow freely between the decks horizontally, and then are forced by baffle 248' upward through the superdeck, through the hollow ware, and into the crown space above the following half of the car behind the crown baffle 250. Then the gases flow horizontally through the crown space toward the next crown baffle and are diverted again downward toward the hollow ware on the leading half of the following car, repeating the downward and upward flow to establish a free flowing serpentine path through the entire kiln. In the compartmented drier sections the vertical path of flow is followed around and around up one half and down the other half of each car section; but the direction of flow depends on the direction of rotation of the reversing fans 173.

Heat is added in the fire zone of the vertical serpentine flow kiln by injecting fuel or burner gases transversely from two opposite burners to scatter the heat and to sustain the ambient temperature. The heat is injected and actively scattered into the streams of emerging gases flowing out of the setting. The mixed gases proceed along the crown space or the superdeck before they flow into the ware at the next downpass or uppass through the ware, thus avoiding any impingement of unmixed burner gases on the product. Since this style of alternate pattern of up and down serpentine flow performs two passes per car length, a preheat zone having, say eight cars, as shown provides sixteen passes of gas through and between each pipe or stack of hollow ware. After emerging from the last pass the gases flow upward to the stack 185 through a wide space left open between crown blocks. The "serpentine" flow with vertical movement of gases inside and outside the product is a feature of the invention. Such vertical flow through tubular products makes possible more uniform heating with less distortion of the ware than is possible with the usual horizontal cross flow.

In a horizontal flow kiln requiring aperture in the longitudinal direction only it is possible to fire hollow tile and hollow brick placing the openings lengthwise in the direction of flow.

The large transverse or plenum spaces between the settings permit of stirring, mixing and blending of various gases by jets to produce uniformity of temperature over each cross section of the kiln. This arrangement of large transverse spaces with active jets of air, or other gas, to produce large movement of the gases in the free spaces for equalization of temperature is one of the outstanding features of the present invention. In case heat is not added, air jets are nevertheless provided between settings to reestablish uniformity of the temperature in the gases before they enter the next setting.

The maximum advantage of the plenum space and the turbulent mixing jets occurs when oil or raw fuel is fed through a jet in the fire zone, finely atomized, and injected into the kiln and scattered uniformly throughout the plenum space. The fuel finds most of the air required for its combustion as it is scattered through the flow of air from the cooling zone already preheated almost to the fire zone temperature. The fuel or combustion gases at any temperature can be added to maintain any desired ambient temperature of a plenum space without pre-burning the fuel, and then diluting the flame temperature gases by the addition of excess air. This principle is especially useful in furnaces requiring a neutral or reducing atmosphere, because the fuel can be injected, atomized and scattered with a minor fraction of the air required for its combustion.

This new method of firing utilizes all of the heat units recouped by a full convection flow through the cooling ware. It adds to the flow of tunnel gases the very minimum volume and weight of combustion gases. It pulls from the fire zone through the preheat zone only sufficient tonnage of preheat gases to maintain the lower end of the preheat gradient at the necessary stack temperature 250° to 300° F.

Burners become simple fuel injectors with jets to scatter and disperse the fuel, without the usual complications of proportional air supply. Fuel is supplied automatically to maintain the desired fire zone temperature. The tonnage flow of gases is closely related to the tons of ware moving through the kiln. If the operating schedule is reduced to one-fourth rate, the stack fan damper may be closed automatically to maintain a chosen stack temperature at say 300° F. If, in an extreme case we stop feeding cars into the kiln, the stack damper may be shut down automatically almost tight to allow only enough gas to flow to supply minimum losses and to maintain the full preheat gradient. Even at the slowest or zero rate of operation there will be no segregation or stratification of gas temperature, top to bottom, because the stirring jets may be left on to maintain uniformity of temperature distribution. Under ordinary conditions, if the conventional tunnel kiln is operated at a reduced rate, the longitudinal flow of gases is reduced and gravitational stratification is more pronounced. But with the tunnel kiln of the present invention, when the jets are operating full force in the intercar spaces, stirring and mixing are even more complete when the kiln is operated at reduced rates. In the extreme case of zero rate of operation, an exit door can be used and partly closed to maintain negative pressure in the tunnel for car cooling.

Full rate operation may be resumed instantly at any time from any level of reduced operation by merely feeding the cars in faster. It may be desirable during a period of protracted slowdown to reduce the temperature in the fire zone a few degrees to avoid change of color, or for other reasons.

The problem of "turndown" ratio has been so serious in previous tunnel kiln designs that it has led to the practice of building many smaller kilns of low capacity instead of one simple and more economical, larger kiln of equivalent total capacity at smaller expense. Daily kiln production to take care of maximum kiln operation over the weekend requires with the present invention the very least number of kiln cars, return tracks, and building space, keeping installation and operating coats at a minimum.

Except for the duplicate small fans and motors on each drier section, and any small auxiliary fans used for "flashing," the tunnel kiln proper requires only one stack fan and one pressure blower, pumping room air. This kiln is free from the usual multiplicity of fans and motors, and ducts and dampers, and hollow kiln walls with dampers and ports and overheated furnaces. Temperature and draft controllers required are of the simplest commercial types.

The use of negative pressure in the upper tunnel and in the baffled tunnel below the car tops, together with adjustable ports 58, which allow room air to be drawn in against the sides and around the bottom of the metal car, constitute a new and positive car cooling system controllable car by car.

Having lower pressure above to keep the hot gases from blowing or leaking downward, it is possible to let air from the room flow in because of negative pressure, through the row of vent holes 58 directly against the sides of the metal car and the bearings below the car tops. The flow of car cooling air at, say, 250° F. up through joints between cars would introduce an entirely prohibitive amount of local cumulative chilling effect in the lower part of the tunnel above the car tops were it not for the high speed, high energy jets J or room air, blowing downward through the crown or sidewise through the side walls of the kiln, at substantially right angles to the tunnel. The car cooling air, finding its way up through the opening between cars in a thin jet the width of the kiln encounters a very turbulent atmosphere caused by the jets through the crown in the plenum space, and is promptly dissipated into the inter car space without causing local cumulative chilling effects in the lower parts of the settings.

It may now be appreciated that many factors, each contributing its part, can result in very complete handling of this requirement of car cooling, so important to the successful operation of a tunnel kiln. These factors are, to summarize: (1) A gas tight tunnel; (2) Negative draft or pressure throughout; (3) Hot or upper refractory sand seals; (4) Open joints or spaces between the ends of cars; (5) Baffles or scraper seals across the car bottoms and sides to prevent longitudinal flow of gases longitudinally of the kiln under and at the sides of the cars; (6) Adjustable ports 58 to let in a manually or automatically temperature controlled flow of car-cooling air, car-by-car as required; (7) The opportunity actually to measure the temperature of each car through the inlet ports; (8) Provision of liberal spaces between car settings; (9) Provision of mixing jets to equalize temperature preferably in each intercar space in the preheat, in the firing zone and in the cooling zone.

The succession of stationary cars or settings with transverse separating chambers constitutes a series of kilns closely connected but separately controlled. Therefore, the features of this invention are applicable to any periodic, or batch, kiln, or metallurgical heating furnace.

Burner gases or fuel at any temperatures may be projected safely into the tunnel without local impingement or local overheating of the product, because through entrainment and active scattering of the gases uniform temperature is attained before the stack fan draws the uniformly mixed gases through the next setting.

Into the plenum, combustion spaces granulated coal or other solid fuel may be dropped through holes in the crown in controlled amounts onto a hearth plate and be be promptly consumed. The heat of this fuel is then actively distrubted because of the dynamic turbulence caused by the jets, because of the ambient temperature, and because of the large excess of free oxygen in the atmosphere of the fire zone. Feeding of solid fuel into positioned transverse spaces between settings is not new, but so far as I am aware, the provision of jets to promote active combustion and diffusion of the heat produced throughout the plenum spaces is new. In this way, the least expensive fuel can be utilized for certain products such as common brick when flyash is not objectionable. To avoid flyash, clean graded nut coal or pellitized coal can be used.

It is a most important advantage of the arrangement of the plenum spaces and jets that the settings and tunnels may be made extremely wide and high without impairing the uniformity of temperature distribution across the tunnel from side to side and from top to bottom. For example, a tunnel six feet wide and four hundred feet long can be replaced with the present invention by a tunnel of equivalent volume twelve feet wide and two hundred feet long.

For a given amount of gas flow, the area of the double width tunnel will be twice as great and the gas velocity one-half. The drop in pressure per car would be one-fourth, and since the number of cars is only one-half, the total draft required would be one-eighth as great as for the longer kiln. Considering the further advantage that in the kiln of the present invention only longitudinal aperture is required, the volume of gases can be increased to three times the flow, giving approximately three times the kiln capacity with practically no increase in total draft requirement.

The heating gases are pulled through the kiln with this increased rapidity and through a fewer number of cars without overheating, particularly at the entrance end, because much more effective heat transfer between the preheat gases and the product is attained through the active turbulence and uniform diffusion of the heating gases, car by car by actively stirring the gases by means of jets in each positioned plenum or intersetting space.

The volume of jet gases required to perform this mixing and stirring operation is so slight that room air at several pounds pressure per square inch may be employed without important or perceptible chilling effects. For example, the weight of jet air per space may be as little as one-tenth of one percent of the weight of gases flowing through the tunnel. The sacrifice of even twenty-five percent of the setting capacity of each kiln car is far more than compensated for by the extra capacity gained by producing ideal uniformity of heat distribution with wider cars.

It is frequently desirable to raise the temperature quickly to about 1100° F. In the interval between 1100° F. and 1400° F. oxidation of carbon and sulphur compounds proceeds very actively along with the high volume of chemical water liberated from the clay substance so that it may be necessary to slow the rate of rise of temperature in this range. At the beginning of this range the free silica content of the body undergoes a striking expansion of volume and adds to the need, in the case of some products, for slowing up the rate of temperature rise to avoid cracking of the product under higher firing schedules that I employ. The time required for oxidation can be greatly reduced by having greater volumes of preheat tunnel gases having a very high content of free oxygen and low concentration of combustion gases. The natural drop in the upper preheat will usually provide ample time in this middle preheat temperature range between 1400° F. and 1100° F.

By injecting hot gases and scattering the heat thoroughly to maintain a fixed gas temperature at the 1100° F. point, the average lower preheat gradient, 1100° F. to 300° F. stack temperature can be made very steep within a few car lengths. If it is desired to lengthen the low rate middle preheat range and use fewer cars with steeper gradients between 1400° F. and 1900° F., or top temperature, room air can be injected and scattered uniformly at the 1400° F. point.

To flatten the temperature gradient in the ware at the critical 1067° F. point, burner gases or other heat may be introduced and scattered uniformly by the jets through the plenum or intersetting space at approximately the 950° F. point. By merely boosting the temperature at the 950° F. level by the injection of heat, the cooling gradient is divided into two ranges. The lower part of the upper range is flattened to go through the 1067° F. point at a low rate, in most cases safely enough to avoid the need for adding cold air.

To control the upper cooling gradient and to reduce the gradient through the critical range, cool room air can be injected and diffused in the 1200° F. product temperature level, to hold the product temperature down to this point. The mixed cooling air temperature at this point must be depressed several hundred degrees below the ware temperature to establish the high cooling rate permissible in this plastic range between top fire zone temperature and 1200° F. This introduction of cooling air to produce a steep upper temperature gradient will also help to produce a lower rate of temperature drop through the 1067° F. point.

The simple burners and dampers and control equipment can readily be shifted from one inter-car space to another after the kiln is built and under fire, because structural changes are not required.

In the cooling zone, the temperature gradient over the whole cross section can be controlled at critical points. The common cause of loss by cracking of the product occurs when the temperature drops unevenly and too fast through the silica inversion point at 1067° F. The danger of cracking is greater for highly vitrified products, for larger and thicker pieces.

The great advantage gained by going slowly through the critical range is that since the ware may be cooled very rapidly above the critical point and below the critical range without harm, the length of the cooling zone is greatly diminished.

In my construction, with plenum spaces and jets, gradient control gases may be introduced and scattered to produce diffused uniformity of transverse temperature at any plenum space desired. Whether supplementary gases are added or not, the jets at each plenum space insure the restoration of ideal uniformity over each such cross-section, car by car. The achievement of this degree of distributed uniformity eliminates the need for local gradient control to a very few and special cases.

Ideal heat distribution in a tunnel kiln may be described as isothermal fronts at all cross sections. Many conditions tend to distort the isothermal front. In the usual situation, the hotter, top gases move forward most rapidly in the less obstructed space between the crown of the kiln and the setting, causing the isothermal front to slope forward at the top several car lengths or several hundred degrees difference top to bottom. Counter-flow "recirculation" nozzles have helped to oppose the excessive top flow, but they are not always effective, and may damage the products.

Another cause for an irregular isothermal front is variable setting. In areas of the cross section having lighter loads and greater aperture for the larger free flow of tunnel gases, less heat is absorbed by the product, and the gases emerge from the setting at higher temperature than for areas of more dense load, which present more product surface for absorption of heat, and cause more sluggish flow of gases.

In a solid train of settings having similar unbalanced disposition of load, differences of temperature are cumulative, or the isothermal front is advanced much further in some areas than in others, right up to the firing zone, in which the blasts from the burners help to even up the bottom temperatures, but find it difficult to penetrate the middle of the setting because it is so much easier for tunnel gases to flow along through the hot side furnace spaces.

These difficulties have heretofore necessitated rows of preheat burners to try to get bottoms of the settings up to the desired temperature, and make it necessary to use extra long fire zones and narrow settings to try to get the heat into the center of the settings. Unevenness of temperature distribution requires extra length of kiln in all zones and finally limits the capacity or lengthens the firing time regardless of the brief time that may be required to fire the products. A few bricks in a small laboratory periodic kiln may be satisfactorily fired and cooled in nine hours. It may require fifty-four hours to fire the same bricks in a commercial tunnel kiln, mostly due to failure to cause fresh, uniformly-heated gases to flow evenly through and among the products. In a most successful tunnel kiln firing bricks at 1900° F. on a thirty hour schedule, it has been found that the bottom temperature approaching the fire zone was as much as 900° F. below the top temperature.

In a kiln built according to the present invention the large plenum spaces between the settings into which the heating gases or fuel can be injected and diffused with complete penetration in the fire zone, and in spaces not under fire, and into which stirring jets of air or gas can be injected at each intersetting or plenum space, provide uniformity of temperature, or an isothermal front over the whole cross section, car by car, in all zones.

In the method of the present invention no time or kiln length is wasted, and the firing time can be reduced much nearer to the minimum possible time.

This same construction with chambers or plenum spaces between settings makes it possible to withdrawn the flow of tunnel gases out of the kiln through a suitable by-pass, shunting the gases in whole or in part around one or more cars, reintroducing them back into the tunnel flow, and diffusing them by thorough remixing by means of jets into the straight-through flow of tunnel gases emerging from the by-pass section. By passing, as described, can be used as a method of gradient control with or without the supplementary hot or cold gas additions.

A special case in which the by-pass may be used in the "flashing" or brick, as described. By means of by-passing the entire tunnel flow of hot gases around at least two cars at top temperature at the end of the firing zone just before a car is moved into the cooling zone, a stagnant atmosphere is produced. Then, by continuing addition of fuel into the space between settings or car loads, a strongly reducing atmosphere is produced as the available oxygen is almost instantly used up. In this simple way we can make use of the iron in the brick and other color producing additives, such as manganese, zinc, etc., to reproduce any chosen effect from black to delicate shades of color.

In another described, simple method of color flashing, requiring no modification of kiln structure, "flashing" is possible in the kiln of the present invention by total interruption or suspension of the flow of tunnel gases for a few minutes only. The tightness of the tunnel, and the absence of fire boxes and complicated fan systems, makes it possible practically to block the total tunnel flow to a stagnant condition by merely shutting the main stack tunnel damper. Fuel continues to be fed into as many burners as desired at full, or reduced, fuel pressure to produce a very strong chemically reducing atmosphere between the loads in the fire zone of the kiln. The high concentration of reducing gases can instantly be produced over the whole cross section, and be precisely timed for as many minutes as is found necessary to produce the desired coloring effect. If it is desired actually to stop, or even to reverse effects to penetrate the center of the car setting, a suction fan can be installed near the ware exit end of the kiln. In this special case the exit doors which are ordinarily left open can be shut to improve the suction during the preheat "flashing" period.

The movement of the tunnel kiln gases may be controlled by the use of a series of small high intensity jets directed toward the fire zone to oppose the excessive flow of hot gases in the preheat. With the present invention it is possible to produce temperatures near the bottom of the kiln practically equal to those at the top. The small high velocity jets entrain several hundred times their own volume of ambient gases so that room air can be used without harmful chilling effects. The dynamic jets cause large stirring and accelerated flow effects.

The use of jets of room air in longitudinal crown spaces is greatly favored by making the jets small and using high pressure with small volume of flow. My jets use room air; also they use more than four ounces per square inch pressure drop through the jet itself. For example, the nozzle used in "recirculation" systems in tunnel jets have heretofore had areas about thirty square inches at a given position with relatively low velocities at which the recirculated tunnel gases are introduced back into the tunnel. With these prior constructions, consideration must be given to matching the temperature of the jet gas with the temperature of the product at the point of introduction.

By the use of small, high speed, jets, the area of the jets at one location may be as small as .03 square inch or one-thousandths as large, approximately, as the thirty square inches mentioned. The gas volume can be very small to produce a desired stirring effect at say 4 to 10 pounds per square inch pressure. The chilling effect is so negligible that the coldest room air or outside air can be used in the jet safely at any temperature along kiln gradients.

With the present invention the ambient gases are stirred right in the kiln, while most "recirculation" systems move the gases from one location, usually the bottom, of the tunnel and throw them back into another location. To avoid damage due to excessive temperature difference between nozzle gas ad product, several "recirculation" systems must be used in conventional construction to serve different limited temperature ranges.

With the present invention one system or source of pressure air serves the entire kiln in all temperature zones. Approximately the same type of jet can be used to atomize liquid fuel, to inject and scatter gases, or liquid fuel, with good uniformity through large inter-setting plenum spaces, and to mix gases of various temperatures to a more uniform average.

In the specification and claims the word "transverse" means crosswise of the length of the tunnel. The word "longitudinal" means lengthwise of the tunnel.

While the invention has been described in connection with several different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth, and as fall within the scope of the invention or the limits of the appended claims.

What I claim is:

1. The method of heat treating groups of products in a tunnel type kiln having a series of heat treating stations therein which comprises periodically advancing spaced groups of the products through the kiln in one direction from station to station, causing a stream of gas to flow in a counter direction through the products and the kiln, introducing a heating medium into the stream of tunnel gases in the spaces outside of adjacent groups, and thoroughly mixing the introduced medium with the stream of kiln gases as they emerge from a group of products at one station before they enter the group of products at the next adjacent station.

2. The method of heat treating groups of products in a tunnel type kiln which comprises advancing longitudinally spaced groups of the products longitudinally through the kiln in one direction, causing a stream of tunnel gases to flow by suction in a counter direction through the products in the kiln, introducing a heating medium into certain regions of the stream out of direct contact with the products, thoroughly mixing the introduced medium with the stream of tunnel gases at said regions in the spaces outside of said groups after the stream of gases has emerged from one group and before it enters the next group, by-passing the stream of gases away from the product at a given point as the groups of product travel through the kiln, and introducing a heated oxygen-reducing fume-ladened atmosphere at said point, to modify the appearance of the product.

3. A heat treating tunnel kiln having an entrance end and an exit end and comprising a drier section and a kiln section, said two sections being arranged in straight-line end-to-end relation and being adapted to have ware-carrying cars advanced therethrough in end to end relation from said entrance end to said exit end, said drier section comprising a plurality of stations, each of which is at least the length of a car, movable partitions for closing off said stations from one another, means for circulating air in each station selectively in either direction, said kiln section also comprising a plurality of stations, each of which is at least the length of a car, means at an intermediate station in said kiln section for supplying heat to said kiln section, a stack communicating with the station of said kiln section which is nearest said drier section, and a fan cooperating with said stack for causing the air in said drier section to flow from one station of said drier section to another in the direction of car movement and to exhaust out of said stack and for drawing gas from said exit end and for causing said air and the kiln gas to flow through said kiln counter to the direction of car movement and to exhaust out of said stack, and means for injecting gases into said kiln section at its stations outside the ware at a station to mix the gases before they flow through the ware at that station.

4. The method of heat-treating ware in a tunnel kiln which comprises stacking the ware in separate, apertured settings, moving the settings longitudinally through the kiln, drawing gases in a serpentine path alternately through the settings and through plenum spaces disposed outside the settings, and agitating the gases in the plenum spaces to produce substantial uniformity of temperatures in the gases in a plenum space before these gases pass from that plenum space into the next setting along the path of flow of the gases.

5. The method of heat-treating ware in a tunnel kiln which comprises stacking the ware in separate, longitudinally-spaced apertured settings so that there are plenum spaces between successive settings, and moving the settings longitudinally through the kiln, while producing a counterflow of gases in a serpentine path alternately through successive spaces and settings in a direction generally opposite to the direction of movement of the settings, and while heating and agitating the gases in certain of said plenum spaces by injecting fuel and heated gases from a heat source thereinto, and while agitating the gases in other of said spaces by injecting gas thereinto, the agitation of the gases in the plenum spaces serving to produce uniformity of temperature of the gases in each agitated plenum space before those gases pass from that plenum space into the next following setting.

6. The method of heat-treating ware in a tunnel kiln which comprises stacking the ware on cars in settings so as to leave spaces above and below the ware and so as to leave vertical passages through the ware communicating with said spaces, and moving the ware longitudinally through the kiln, while producing a counterflow of gases in a serpentine path through said spaces and vertical passages in a direction generally opposite to the direction of movement of the ware, injecting heat from a heat source into at least one of said spaces and injecting gases into all said spaces to stir up and agitate the gases in said spaces to produce uniformity of the temperature of the gases in each space before those gases pass from that space into the next following setting.

7. The method of heat-treating ware in a tunnel kiln which has a plurality of plenum spaces at opposite sides, the plenum spaces at one side overlapping those at the other side, said method comprising stacking the ware in separate, horizontally-apertured settings, and moving the settings longitudinally of the kiln between the opposed plenum spaces, while producing a counterflow of gases in a horizontal serpentine path through a plenum space and a setting successively and in a direction generally opposite to the direction of movement of the settings, injecting heat from a heat source into at least one of said plenum spaces, and injecting gases into all said spaces to stir up and agitate the gases in each space before those gases are drawn from that space into a setting.

8. The method of heat-treating ware in a tunnel kiln which comprises stacking the ware in a plurality of apertured settings and moving the settings through said kiln so that they travel successively through a preheating zone, a heating zone, and a cooling zone, injecting hot gases from a heating source into plenum spaces outside said settings when the settings are in the heating zone to heat and agitate the gases in said spaces and achieve substantial uniformity of temperature therein, and injecting gases into plenum spaces outside said settings also when the settings are in the preheating and cooling zones to achieve uniformity of temperature in the last-named spaces also, and producing a counterflow of gases successively through said settings and plenum spaces in a direction opposite to the direction of movement of the settings.

9. The method of heat-treating ceramic ware which comprises stacking the ware in longitudinally-spaced settings so that spaces are left between successive settings, moving the settings intermittently longitudinally through a tunnel, heating the gas in the space at one end of one of said settings while mixing and diffusing said gas, and, while drawing the heated gas through said one setting, introducing and diffusing into the space at the opposite end of said one setting fuel and coloring matterials to cause a strongly reducing fume-laden atmosphere to be formed in the last-named space, and drawing said fume-laden atmosphere through said setting in the direction opposite to the direction in which the heated gas is withdrawn, and then reversing the directions of flow of the heated gas and of said fume-laden atmosphere through said one setting.

10. The method of heat-treating ceramic ware which comprises stacking the ware in longitudinally-spaced settings so that spaces are left between successive settings, moving the settings intermittently longitudinally through a tunnel kiln having a fire zone along part of its length between the entrance and exit ends of the kiln, said fire zone having the length of a plurality of settings, heating the gas in the spaces between the settings when they are in said fire zone, drawing air from the exit end of the kiln through said fire zone toward the entrance end of the kiln, stopping the general flow of gases from the exit end toward the entrance end of the kiln when a setting is at one position in said fire zone, and injecting and scattering coloring material into the space at one end of the setting, which is in said one position, and withdrawing the gases from the space at the opposite end of the setting which is in said one position while said general flow of gases is stopped, and then restoring said general flow of gases while stopping the injection and scattering of the coloring matter and said withdrawal of gases.

11. The method of heat-treating ceramic ware which comprises stacking the ware in separate, longitudinally-spaced settings, moving the settings longitudinally through a tunnel kiln having preheating, firing, and cooling zones, causing the gases in said kiln to flow in one general direction alternately through settings of ware and the spaces between successive settings, heating the gases in the spaces of the firing zone of said kiln while agitating the gases in said firing zone spaces, and diverting the flow of gases around a setting when it is in the firing zone, so that there will be slight movement only of said gases through the by-passed setting, and injecting and infusing fuel into the firing zone space at one end of the by-passed setting, to produce a strongly reducing atmosphere and to color the by-passed setting.

12. The method of heat-treating ware in a tunnel kiln which comprises stacking the ware in longitudinally-spaced settings, flowing air through the kiln on a changing temperature gradient while moving the ware counter to the flow of air, by-passing the air around each setting when the setting is located in the kiln in the critical range of temperature of the ware, and then drawing the by-passed air back through each setting when it is in such range so that the air flows alternately through the ware, when in such critical range, in the direction of movement of the ware, and agitating the air in spaces outside the settings so as to insure uniformity of temperature of the air in such spaces before it passes through the settings.

13. A tunnel kiln having entrance and exit ends, jets disposed at longitudinally spaced stations along the length of said kiln for injecting gases into said kiln at said stations, a train of cars for carrying settings of products, which are to be heat-treated, through the kiln, means for periodically advancing said cars step-by-step through said kiln from the entrance end to the exit end thereof, means for causing a current of gas to flow from the exit end of said kiln toward the entrance end thereof, said jets being disposed to deliver gases into said kiln outside said settings, as the cars are advanced through the kiln and at a velocity greater than that of said current to turbulently mix the gases present at a given station to achieve uniformity of temperature in those gases before they flow through a setting, the jets at certain of said stations serving to introduce heat into the gases at said certain stations.

14. A tunnel kiln as claimed in claim 13 wherein the stations are spaced longitudinally a car's length apart so that said jets register with the spaces between successive cars.

15. A tunnel kiln for firing clay pipe and other products, said kiln having an entrance end and an exit end, a train of cars on which settings of the products, which are to be fired can be arranged with vertical apertures extending through the settings, means on said cars for providing spaces beneath the products that communicate with said apertures, the height of said kiln being greater than the height of said settings on the cars so that spaces are also provided above said settings which communicate with said apertures, jets disposed at longitudinally-spaced stations along the length of said kiln for injecting gases into said kiln, means for moving said cars through said kiln from said entrance end to said exit end, means including a plurality of baffles disposed in longitudinally spaced relation along said kiln for causing gases to travel through said kiln from said exit end toward said entrance end in a vertically serpentine path passing through said apertures, and means for injecting gases into said kiln outside said settings at certain of said stations at least.

16. A tunnel kiln having entrance and exit ends, ware carrying cars on which settings of the ware, which is to be heat-treated is adapted to be stacked, means for moving said cars through the kiln from said entrance to said exit end, means for drawing the tunnel gases through the kiln from said exit end toward said entrance end, jets spaced longitudinally along said kiln for injecting gases into said tunnel gases in spaces outside said settings to turbulently mix said injected gases and tunnel gases, and means for by-passing the tunnel gases around one or more settings, and for then remixing the by-passed gases into the combined flow of gases to modify the rate of heat-transfer in the by-passed settings.

17. A tunnel kiln for firing ceramic ware, having an entrance end and an exit end and having plenum spaces along its opposite sides that are spaced from one another longitudinally of the kiln, said kiln having baffles disposed alternately at opposite sides of the kiln, the baffles at the same side of the kiln being spaced from one another longitudinally of the kiln to define the ends of the plenum spaces at that side, means for moving apertured settings of the ware longitudinally through the kiln from said entrance end to said exit end, means for drawing gases through said kiln, through the ware and said plenum spaces successively to cause flow of the gases in the kiln in a horizontal serpentine path, and means for injecting air and fuel into different said plenum spaces to inject and mix gases in the different plenum spaces before the gases are drawn through the ware.

References Cited in the file of this patent

UNITED STATES PATENTS

| | | |
|---|---|---|
| 1,122,879 | Drayton | Dec. 29, 1914 |
| 1,223,732 | Reams | Apr. 24, 1917 |
| 1,419,070 | Mays | June 6, 1922 |
| 1,591,599 | Wilson et al. | July 6, 1926 |
| 1,602,721 | Straight | Oct. 12, 1926 |
| 1,610,968 | Robertson | Dec. 14, 1926 |
| 1,701,223 | Bergman | Feb. 5, 1929 |
| 1,738,040 | Cope | Dec. 3, 1929 |
| 1,823,356 | Frink | Sept. 15, 1931 |
| 1,826,776 | Gunther | Oct. 13, 1931 |
| 1,861,759 | Soper | June 7, 1932 |
| 1,893,123 | Beth | Jan. 3, 1933 |
| 1,898,042 | Forse et al. | Feb. 21, 1933 |
| 1,908,186 | Robertson | May 9, 1933 |
| 1,970,320 | Kier et al. | Aug. 14, 1934 |
| 2,042,870 | Stafford | June 2, 1936 |
| 2,067,414 | Reintjes | Jan. 12, 1937 |
| 2,104,173 | Sibson | Jan. 4, 1938 |
| 2,212,004 | Berthiaume et al. | Aug. 20, 1940 |
| 2,238,806 | Doubledent | Apr. 15, 1941 |
| 2,414,255 | Dugan | Jan. 14, 1947 |
| 2,444,365 | Pluck | June 29, 1948 |
| 2,461,770 | Puccinelli | Feb. 15, 1949 |
| 2,525,101 | Robson | Oct. 10, 1950 |
| 2,532,190 | Pirani et al. | Nov. 28, 1950 |
| 2,567,556 | Dressler et al. | Sept. 11, 1951 |
| 2,600,460 | Antill | June 17, 1952 |
| 2,625,730 | Cremer | Jan. 20, 1953 |
| 2,779,082 | Scharf | Jan. 29, 1957 |

OTHER REFERENCES

Searle: Encyclopedia of the Ceramic Industries, vol. 3, E. Benn, Ltd., London (1930), page 310.